United States Patent
Dietze et al.

(10) Patent No.: US 7,722,077 B2
(45) Date of Patent: May 25, 2010

(54) AIRBAG CONFIGURATION IN A VEHICLE

(75) Inventors: Holger Dietze, Cremlingen (DE); Peter Dahmen, Braunschweig (DE); Jörn Kessler, Langen (DE)

(73) Assignee: Volkswagen AG, Wolfsburg (DE)

( * ) Notice: Subject to any disclaimer, the term of this patent is extended or adjusted under 35 U.S.C. 154(b) by 903 days.

(21) Appl. No.: 10/827,626

(22) Filed: Apr. 19, 2004

(65) Prior Publication Data

US 2004/0195810 A1 Oct. 7, 2004

Related U.S. Application Data

(63) Continuation of application No. PCT/EP02/09540, filed on Aug. 27, 2002.

(30) Foreign Application Priority Data

Oct. 17, 2001 (DE) ................ 101 50 660
Dec. 21, 2001 (DE) ................ 101 63 686

(51) Int. Cl.
   *B60R 21/20* (2006.01)
(52) U.S. Cl. .................... 280/732; 280/728.2
(58) Field of Classification Search ........... 280/732, 280/728.2
   See application file for complete search history.

(56) References Cited

U.S. PATENT DOCUMENTS

| | | | |
|---|---|---|---|
| 3,817,552 A | | 6/1974 | Knight, IV et al. |
| 4,105,223 A | * | 8/1978 | Oda et al. .................. 280/752 |
| 4,474,391 A | * | 10/1984 | Matsuno et al. ............ 280/752 |
| 5,087,067 A | * | 2/1992 | Seki et al. .................. 280/732 |
| 5,209,519 A | | 5/1993 | Shiga et al. |
| 5,320,381 A | * | 6/1994 | Barnes et al. ............ 280/728.3 |
| 5,547,215 A | | 8/1996 | Taguchi et al. |
| 6,022,043 A | | 2/2000 | Harnisch et al. |
| 6,170,857 B1 | * | 1/2001 | Okada et al. ............ 280/728.1 |

(Continued)

FOREIGN PATENT DOCUMENTS

DE        196 11 384 A1        9/1997

(Continued)

OTHER PUBLICATIONS

The Public Citizen "Joint Petition for (1) Inclusion of Vehicle-Specific Air Bag Specifications in the NHTSA Brochure—Air Bags and On-Off Switches: Information for an Informed Decision", Feb. 12, 1998-found at (www.citizen.org/print_article.cfm?ID=1354 ).*

*Primary Examiner*—Ruth Ilan

(57) ABSTRACT

An airbag configuration provides an airbag outlet opening in a front instrument panel wall region. A given safety distance is provided between the airbag outlet opening and a potential head impact region of a vehicle occupant. The potential head impact region is provided in a head-impact instrument panel wall region adjoining the front instrument panel wall region in a direction away from a windshield and towards the vehicle interior. The safety distance is provided in such a manner that the airbag, after advancing in the direction of the vehicle interior by a distance corresponding to the safety distance between the airbag outlet opening and the potential head impact region, has a filling pressure which is reduced in accordance with predetermined limit values in comparison with the initial filling pressure in the airbag at the beginning of the airbag activation.

65 Claims, 7 Drawing Sheets

U.S. PATENT DOCUMENTS 6,193,271 B1 2/2001 Shimane
6,250,678 B1 * 6/2001 Yoshinaka et al. .......... 280/752

FOREIGN PATENT DOCUMENTS

| | | | |
|---|---|---|---|
| DE | 197 04 684 C2 | 8/1998 |
| DE | 198 60 804 A1 | 7/2000 |
| DE | 199 15 974 A1 | 10/2000 |
| EP | 0 997 352 A1 | 5/2000 |
| EP | 1 038 737 A2 | 9/2000 |

* cited by examiner

AIRBAG CONFIGURATION IN A VEHICLE

CROSS-REFERENCE TO RELATED APPLICATION

This application is a continuation, under 35 U.S.C. §120, of copending international application No. PCT/EP02/09540, filed Aug. 27, 2002, which designated the United States; this application also claims the priority, under 35 U.S.C. §119, of German patent application No. 101 50 660.0, filed Oct. 17, 2001, and German patent application No. 101 63 686.5, filed Dec. 21, 2001; the prior applications are herewith incorporated by reference in their entirety.

BACKGROUND OF THE INVENTION

Field of the Invention

The invention relates to an airbag configuration in a vehicle, in particular to an airbag configuration in a motor vehicle.

An airbag configuration in a motor vehicle is disclosed, for example, in German Patent No. DE 197 04 684 C2. The airbag configuration disclosed therein is configured as a front-passenger airbag configuration in which the airbag together with the associated gas generator, i.e. the entire airbag module, is disposed in a rear instrument panel region which faces away from the windshield and is assigned directly to the front-passenger sitting position. As a result, the intention, in the event of the front-passenger airbag configuration being activated, is for the airbag to be rapidly inflated in front of the front passenger who is in a normal sitting position. Due to this configuration of the airbag in the rear instrument panel region, immediately after its activation, the airbag here is therefore inflated directly in the inflation region in front of the front passenger at a high filling pressure of, for example, approximately 30 bar. A construction of this type is problematic in conjunction with vehicle occupants who are not in a normal sitting position (out-of-position), for example children standing directly behind the instrument panel in the front passenger region, or else children and adults who are situated, for example, in a posture with the head bent forward or inclined in the direction of the instrument panel and/or who are possibly not wearing their seatbelts as required. In such a case, there is the risk that, in the event of an accident, the vehicle occupants will hit their head on this rear instrument panel region, which faces the front passenger, even before the airbag, as primary impact protection, is activated, or at least will move in the direction of this potential head impact region, which, with an airbag activation taking place at the same time, may result in a risk of injury for the vehicle occupants, since the airbag is inflated here, on account of the very high initial filling pressure, with maximum airbag aggressiveness in the direction of the vehicle occupant or the region of his head.

A similar construction having the disadvantages just mentioned is furthermore also disclosed in Published, Non-Prosecuted German Patent Application No. DE 199 15 974 A1.

Furthermore, airbag configurations on a module carrier of a motor vehicle have been disclosed, for example in European Patent Application No. EP 1 038 737 A2, in which an airbag module is fixed on a module carrier in the form of a cross member. This module carrier extends as a vehicle cross member between the opposite A-pillars in a region approximately level with a heating and air-conditioning unit, and in a region in front of the heating and air-conditioning unit, in relation to the instrument panel, as seen in the direction of the vehicle longitudinal axis. An accommodating section into which the airbag module can be inserted and fixed in place is formed on the cross member. The securing devices for the airbag module are configured here in such a manner that the airbag module, after insertion into the securing devices, has to be rotated in order to transfer the airbag module into the correct position of use. This rotary fastening makes removal or replacement possible without the module carrier having to be removed in its entirety. A disadvantage of this construction is, however, that structural changes have to be undertaken here on the cross member itself, which is generally undesirable, since the module carrier in the form of a cross member is an essential load-bearing component for the vehicle stiffness. A construction of this type is therefore overall of little practical use.

U.S. Pat. No. 5,087,067, which shows a generic airbag configuration, U.S. Pat. No. 3,817,552, European Patent Application No. EP 0 997 352 A1 and U.S. Pat. No. 5,209,519 each disclose a construction in which an airbag outlet opening is formed in the front instrument-panel wall region close to the windshield. In European Patent Application No. EP 0 997 352 A1, the intention is to avoid, through the use of a special folding and deployment of the airbag, the airbag making contact with the windshield. In U.S. Pat. No. 3,817,552, the intention is to permit a simple preassembly of the system. In U.S. Pat. No. 5,087,067, the intention is to improve the inflation behavior of the airbag in that fluttering of the airbag during the inflation process is to be avoided through the use of a special technique of blowing in gas. For example, for this purpose, a gas flow is directed upward toward the windshield. By contrast, U.S. Pat. No. 5,209,519 is based on the object of providing an airbag housing which can absorb impact energy and, in addition, has sufficient mechanical strength, i.e. the airbag housing is to have regions of differing strength. For this purpose, a two-part airbag housing is provided. Furthermore, U.S. Pat. No. 5,547,215 positions an airbag outlet opening obliquely, so that an airbag can no longer come into contact with the windshield during the inflation process. By contrast, U.S. Pat. No. 6,193,271 is based on a construction in which the airbag outlet opening is provided in the potential impact region. The same would be the case if the construction according to Published, Non-Prosecuted German Patent Application No. DE 198 60 804 A1 were transferred to a front passenger region of an instrument panel.

SUMMARY OF THE INVENTION

It is accordingly an object of the invention to provide an airbag configuration on an instrument panel of a vehicle, in particular of a motor vehicle, which overcomes the above-mentioned disadvantages of the heretofore-known airbag configurations of this general type and with which the aggressiveness that an inflating airbags may exhibit toward vehicle occupants, in particular vehicle occupants who are out-of-position in the front passenger region, can be considerably reduced.

With the foregoing and other objects in view there is provided, in accordance with the invention, an airbag configuration, including:

an instrument panel having a front instrument-panel wall region assigned to a windshield of a vehicle and a head-impact instrument panel wall region adjoining the front instrument panel wall region in a direction away from the windshield and toward a vehicle interior, the front instrument panel wall region being configured as an instrument-panel-side airbag outlet wall region, the head-impact instrument panel wall region having a potential head impact region for a vehicle occupant;

an airbag disposed behind the instrument-panel-side airbag outlet wall region when the airbag is in an unactivated, folded-up basic state;

the airbag, when in an activated state, being inflated such that the airbag deploys through an airbag outlet opening to be formed in the instrument-panel-side airbag outlet wall region and such that the airbag is inflated in the vehicle interior in front of the instrument panel, the airbag having an initial filling pressure at a beginning of an airbag activation; and the airbag outlet opening, to be formed in the front instrument panel wall region when the airbag is inflated, being disposed at a given safety distance from the potential head impact region, the given safety distance being provided such that the airbag, after advancing in a direction toward the vehicle interior by a distance corresponding to the given safety distance between the airbag outlet opening and the potential head impact region, has a filling pressure which is reduced with respect to the initial filling pressure in accordance with given limit values.

In other words, according to the invention, there is provided, an airbag configuration in a vehicle, in particular a motor vehicle, the airbag configuration having at least one airbag which, in the unactivated, collapsed basic state, is disposed behind an instrument-panel-side airbag outlet wall region of an instrument panel and which, in the activated state, can be inflated in the vehicle interior in front of the instrument panel through an airbag outlet opening which can be formed in the instrument-panel-side airbag outlet wall region, the at least one airbag, in the unactivated, collapsed basic state, being disposed behind a front instrument panel wall region, assigned to a windshield, as the instrument-panel-side airbag outlet wall region, wherein the airbag outlet opening, which can be formed in the front instrument panel wall region, is at a predetermined safety distance from a potential head impact region of a vehicle occupant in a head-impact instrument panel wall region adjoining the front instrument panel wall region away from the windshield in the direction of the vehicle interior, wherein the safety distance is predetermined in such a manner that the airbag, after advancing in the direction of the vehicle interior by a distance corresponding to the safety distance between the airbag outlet opening and the potential head impact region, has a filling pressure which is reduced in accordance with predetermined limit values in comparison with the initial filling pressure in the airbag at the beginning of the airbag activation.

With a safety distance of this type, which is to be taken into consideration in the construction of the instrument panel, between the airbag outlet opening and an instrument-panel-side potential head impact region of a vehicle occupant, such a depth of an instrument panel in the vehicle longitudinal direction is advantageously achieved that, in particular when there are vehicle occupants who are out-of-position in the front passenger region, the risk of the vehicle occupants being injured is considerably reduced, since the airbag emerging through the airbag outlet opening in the front instrument-panel wall region has already dissipated a considerable part of its very high initial filling pressure before striking against the vehicle occupant, and so the impact of the airbag against the vehicle occupant is much less aggressive. With an increasing safety distance between the airbag outlet opening and the potential head impact region of an instrument panel, i.e. with an increasing depth of the instrument panel, the aggressiveness of the airbag decreases when actually striking against a vehicle occupant, since the filling pressure in the airbag decreases considerably with every centimeter covered, in particular at the beginning of the airbag deployment.

Due to the safety distance on the instrument panel in accordance with the invention, an airbag configuration can therefore be provided at an instrument panel, in which the airbag, as before, can be inflated directly toward the desired inflation region, but the filling pressure in the airbag is dissipated along the safety distance of the instrument panel to such an extent, preferably until the desired final filling pressure of the airbag is reached, that the aggressiveness of the airbag when striking against a vehicle occupant who is out-of-position is reduced as far as possible. Due to the high initial filling pressure, the airbag can very rapidly cover the safety distance during the inflation process, so that, as a result, there is also no significant delay in the inflation of the airbag in front of a vehicle occupant who is, for example, in a normal sitting position.

According to one particularly preferred embodiment, the safety distance is defined in such a manner that, after the airbag has advanced by a distance corresponding to the defined safety distance, the filling pressure in the airbag in the potential head impact region is at most approximately 15%, preferably at most approximately 10% and most preferably at most approximately 5% of the initial gas pressure. Since the filling pressure in the airbag is a function of the distance covered, the safety distance, according to a further preferred embodiment, is to be, for example, at least approximately 10 cm, but preferably at least 15 cm and most preferably at least approximately 20 cm, depending on the particular impact situation. This allows to achieve very good results with respect to the reduced aggressiveness of the airbag. According to one specific embodiment, the airbag has an initial filling pressure between approximately 30 bar and 35 bar and, after advancing by a distance of approximately 100 mm, the filling pressure is approximately 2.5 to 3.5 bar and, after advancing by a distance of approximately 200 mm, is preferably approximately 1.5 to 2.5 bar. According to one specific embodiment of this type, the airbag has therefore dissipated approximately 90% of its initial filling pressure after advancing a distance of approximately 100 mm, and approximately 95% of its initial filling pressure after advancing a distance of approximately 200 mm, with the desired filling pressure in the airbag at the end of the inflation process being approximately 1.5 to 2.5 bar. The effect therefore advantageously achieved with a specific construction of this type is that, at a safety distance of approximately 200 mm, the aggressiveness of the airbag is reduced in the maximum possible manner. Even with a safety distance of approximately 100 mm, the aggressiveness of the airbag is reduced here to such an extent that the risk of injury for the vehicle occupants, in particular for children who are out-of-position in the front passenger region, is considerably reduced.

In principle, there are various possibilities for defining the starting and end point of the distance corresponding to the safety distance. For example, it is possible to define the one end point of the safety distance approximately in a central region of the airbag outlet opening which can be formed and also to define the other end point approximately in a central region of the potential head impact region of the instrument panel. However, the safety distance, as seen in the cross section through the instrument panel, is particularly preferably approximately the rectilinear, shortest path or connecting line between the beginning or periphery of the potential head impact region facing the airbag outlet opening and the beginning or periphery of the airbag outlet opening facing the potential head impact region. This allows minimizing possible inaccuracies from the outset and allows a configuration to be optimized. In addition, the beginning of the head impact region then preferably constitutes here the limit region against which a vehicle occupant's head can impact, depending on the different head impact situations, for example a 3-year old child standing and a 6-year old child seated and not wearing a seat belt, in accordance with predetermined test conditions. This is because, depending on the starting position, the head impact may be situated sometimes to a greater extent and sometimes to a lesser extent in the direction of the front instrument panel region. The safety distance is then preferably measured here from that region of the potential head impact region which, of all situations, is situated closest to the airbag outlet opening. This substantially increases the functional reliability.

Furthermore, there is the possibility, in principle, of providing the gas generator away from the airbag, for example of it being connected to the latter via a gas lance. It is particularly preferred, however, according to a further, particularly preferred embodiment of the invention, for the at least one airbag to be part of an airbag module which includes at least one gas generator, which is assigned to the at least one airbag, as a filling device, the at least one airbag and the at least one gas generator being accommodated in an airbag housing. A housing outlet region for the airbag is provided on the airbag housing, which region is assigned to the instrument-panel-side airbag-outlet wall region. The effect therefore advantageously achieved with a construction of this type is that the entire airbag module, including airbag housing, airbag and gas generator, in the fitted state, is shifted forward, away from the potential head impact region in the rear instrument panel region, in the direction of the front instrument panel region. As a result, the clearance obtained here in the region below the potential head impact region of the instrument panel can advantageously be used in other ways. For example, in such a manner that the potential head impact region of the instrument panel is produced at least in some regions from an energy-absorbing material. The potential head impact region here is particularly preferably produced from a material which can be deformed with energy being absorbed, and the obtained clearance below the potential head impact region of the instrument panel is configured as a deformation space, so that, when a head impacts against the potential head impact region, this region of the instrument panel can be deformed without obstruction, with energy being absorbed, into the deformation space. A deformation space of this type advantageously avoids that instrument panel region against which the vehicle occupant impacts and which is deformed from prematurely forming a solid barrier, so that a relatively large amount of impact energy can be absorbed, which leads to a considerable reduction in the risk of injury for the vehicle occupant.

According to a preferred embodiment of the invention, in the connecting region between a gas-generator housing region accommodating the gas generator and an airbag housing region accommodating the airbag, at least one material weakening and/or predetermined breaking point is provided and, when force is applied to one of the two housing parts, in particular when force is applied to the gas-generator housing region, which protrudes at least in some regions into a deformably configured, potential head impact region of the instrument panel, breaks and prevents the deformation region from forming a solid barrier. The effect achieved with a construction of this type, in which predetermined breaking points or alternatively material weakenings are provided, is that a housing subregion situated in a deformation region, as may be the case, in particular, with particularly confined installation conditions, does not obstruct the deformation to a very great extent. In this case, the predetermined breaking point or material weakening may be configured in such a manner that the gas flow into the airbag is completely suppressed, if this is desired, by, for example, the one housing subregion being blown off. As an alternative to this, however, a material weakening, for example in the form of a plastic deformation, may also be provided permitting, as before, a gas flow into the airbag.

For example, the potential head impact region of the instrument panel can essentially be produced from a backing layer of energy-absorbing foam preferably covered with a slush skin. A construction of this type can also be realized relatively favorably and is highly effective.

A further advantage of this shifting of the airbag module in the direction of the front instrument panel region which faces the windshield is that the clearance obtained as a result below the potential head impact region of the instrument panel may also be used to position an air duct in the installation clearance, in particular a main air duct of the main air supply to individual discharge nozzles. This air duct may be formed integrally with a bottom side of the instrument panel, in which case a bottom-side wall region of the instrument panel preferably forms part of the air duct wall. As an alternative to this, the air duct may, however, also be configured in a different manner, for example with a closed cross section, and, for example, connected to the bottom side of the instrument panel via other fastening possibilities, for example screw connections and/or clip connections and/or welding connections. In the case of a novel air duct concept of this type, it is particularly preferred that it permits the shortest connecting paths of the air duct to the main discharge nozzles to be produced in the rear instrument panel region facing the vehicle occupants. A construction of this type, in which the main air ducts are situated in the rear instrument panel region, is completely converse to the previously pursued concept, in which the main air duct is always provided in the front instrument panel region. A further advantage of this construction, in which the air duct is situated below the potential head impact region of the instrument panel, is that this air duct is not a load-bearing and stiff component which would greatly impair a possibly required deformation of the potential head impact region of the instrument panel into the clearance, which serves as a deformation space, since the air duct can readily take part in this deformation movement.

According to a further particularly preferred embodiment of the airbag configuration, provision is made for an airbag-module accommodating device to be provided below the instrument-panel-side airbag outlet wall region, to which device the airbag module can be releasably connected in order to fix it in its installed position. An airbag-module accommodating device of this type constitutes a substantial installation aid for fixing the airbag module in its installation position. It can be fixed in a particularly simple manner if the airbag module can be connected to the airbag-module accommodating device through the use of at least one guide device, since the airbag module has then, within the context of installation, to be merely pushed in, for connection to the airbag-module accommodating device or, within the context of removal, has merely to be pushed out, as is required, for example, in a customer service situation.

In particular, fixing the airbag module above the module carrier is problematic, i.e. in a gap region between the instrument-panel-side airbag outlet wall region and the module carrier, since this gap region is accessible only with difficulty with a tool or other aids, for example when undertaking customer service measures, and a simple removal and installation of the airbag module or replacement module is therefore not possible without extensive reconstruction measures, for example the removal of the instrument panel, being required for this. However, it is always only possible to remove the airbag module in its entirety, since the manufacturers of airbag modules of this type provide a warranty and guarantee only for the entire module in the assembled state. However, the airbag module can be pushed out and/or pushed into the gap region between the instrument-panel-side airbag outlet wall region and the module carrier and fixed in place under guidance through the use of the at least one guide device essentially from below the module carrier, as seen in the direction of the vehicle vertical axis, and essentially from behind the module carrier, as seen in the direction of the vehicle longitudinal axis. With a construction of this type, the installation and removal of the entire airbag module is advantageously substantially facilitated, in particular in the customer service sector, since the airbag module can be installed and removed in an easily accessible manner from the bottom at the rear without fastening elements, such as screws, etc., which are situated on the upper side of the module carrier having to be released for this. As a result, a complicated removal of the instrument panel does not therefore need to take place in the event of a removal and installation in the customer service sector, in order to render the airbag module accessible for installation or removal.

In a particularly preferred, specific embodiment, the airbag housing is a box-shaped construction with opposite airbag-housing side walls. The airbag housing, in the pushed-in state of the airbag module, is surrounded by the airbag-housing accommodating device, which is configured as an airbag-module accommodating housing, at least by accommodating-housing side walls which are assigned to the airbag-housing side walls, the at least one guide device being formed in the region of the side walls of the airbag housing and of the airbag-module accommodating housing. A first guide element is provided on each airbag-housing side wall and interacts with a second guide element correspondingly formed on the respectively associated accommodating-housing side wall. In the case of a construction of this type, in which the at least one guide device is formed in the region of opposite side walls, a particularly good and specific guidance during the pushing of the airbag housing into or pushing it out from the airbag-module accommodating housing is provided. The at least one guide device is particularly preferably configured as a slotted guide configuration with a guide slot and a guide pin which is guided therein as a sliding block. A specific construction of this type of a guide device can be produced relatively simply and inexpensively with high functional reliability.

The at least one guide slot is preferably formed on the airbag-module accommodating device, for example in the accommodating-housing side wall, while the at least one guide pin is formed on the airbag housing. In principle, however, a construction would also be conceivable, in which conversely a guide pin is formed in the accommodating-housing side wall and, in a correspondingly associated manner, the guide slot, for example in the manner of a guide groove, is formed on the airbag housing.

In a further preferred, specific embodiment, the guide slot is guided obliquely upward on the accommodating-housing side wall as a first slot region in a side wall region which is at the rear in relation to the instrument panel, as seen in the direction of the vehicle longitudinal axis, which region protrudes essentially also at the rear over the module carrier, starting from a side-wall edge region which is at the bottom in relation to the direction of the vehicle vertical axis until it reaches a side wall region which is at the top in relation to the direction of the vehicle vertical axis. Furthermore, the guide slot is guided forward, as seen in the vehicle longitudinal direction, on the accommodating-housing side wall as a second slot region, which directly adjoins the first slot region, in a side wall region which is at the front in relation to the instrument panel, as seen in the vehicle longitudinal direction, starting from the first slot region on the accommodating-housing side wall. With a slot geometry of this type, pushing the airbag module into and pushing the airbag module out of the accommodating housing is possible in a particularly simple and functionally reliable manner.

In principle, the entire guide slot could also be formed here in a continuously rising manner without being divided into individual slot regions. However, according to a particularly preferred embodiment, the second slot region is guided forward first of all essentially horizontally and then with a smaller rising angle in comparison with the first slot region, the horizontal subregion of the second slot region preferably extending essentially above the module carrier. The effect achieved with a slot geometry of this type is that, immediately after the guide pins are inserted after passing through the first slot region, a blocking or a formation of a solid barrier in the region above the module carrier is prevented by allowing a tilting of the frontmost airbag-housing edge region in a particularly simple manner through the use of the horizontal subregion, this being particularly problematic if the airbag-module accommodating housing has an upper wall which covers the airbag module. Subsequently, a further displacement of the airbag module via the guide device into the desired end position can then be obtained.

The dimensioning of the guide device is preferably selected in such a manner that the guide slot extends approximately over the entire accommodating-housing side wall length, as seen in the vehicle longitudinal direction. This means that the airbag-module accommodating housing is optimally adapted in respect of its construction and dimensioning to the requirements for pushing the airbag module into or pushing it out from the airbag-module accommodating housing.

The guide slots are preferably in each case formed identically on the opposite accommodating-housing side walls, thus producing identical conditions on opposite sides for a specific and directed guidance during the pushing-in or pushing-out process. The functional reliability can thereby be substantially increased.

According to a further, preferred embodiment, the guide pin is provided on the opposite airbag-housing side walls in each case in a front airbag-housing side wall region which faces the instrument panel. As a result, an overall compact construction is possible, since, in the fitted and pushed-in state of the airbag module, an essentially direct abutting connection of the accommodating housing against the airbag housing can be formed.

The front guide-slot end, which is assigned to the instrument panel, is particularly preferably configured as a latching socket into which the guide pin can be releasably latched in the pushed-in end position of the airbag module. This can be undertaken, for example, by the latching socket being configured as a U-profile in which the guide pin is accommodated. A latching socket of this type is, for example, advantageous if there are large recoiling forces which would possibly push the airbag housing to the rear out of the accommodating housing when the airbag is activated. As an alternative or in addition, the airbag housing can also be securely fixed in the accommodating housing by the guide pin being clamped in the guide slot wherein the clamping can be overpowered by pushing, so that the guide pin can be displaced only when a certain clamping force, as the resistance force against the guide pin being pushed in, is exceeded.

Particularly preferred is a construction, in which the airbag housing of the airbag module, in the state in which it is pushed into the airbag-module accommodating housing, is accommodated approximately in a form-fitting manner therein, and an accommodating-housing upper wall covers the airbag housing from above. On the one hand, this permits a very compact construction as is advantageous in particular for confined installation conditions, such as are provided in the gap region between the module carrier and the instrument panel. On the other hand, this also ensures that the airbag housing is securely fixed and supported in the airbag-module accommodating housing.

According to a further, preferred embodiment, as an alternative or in addition to other fastening measures, provision may be made for the airbag housing to be connectable to the accommodating housing in an installation region which is readily accessible from below and, in relation to the instrument panel, is situated behind the module carrier toward the vehicle interior, as seen in the vehicle longitudinal direction, through the use of at least one releasable connection, for example a clip and/or screw connection. In order to release these, for example, screw connections, for example for a customer service, the screw connection can be released in a simple manner from below with a corresponding screwdriver or the like. Subsequently, the airbag housing can then be pushed out of the accommodating housing downward at the rear via the guide device according to the invention. Analogously thereto, it is then possible, in the case of a new installation of a replacement airbag module, for the latter to be pushed again in the previously described manner into the airbag-module accommodating housing and then for the at least one screw connection to likewise be secured again. With screw connections of this type a particularly advantageous fixing of the airbag housing in the airbag-module accommodating housing is possible, the fixing also being easily accessible.

The at least one releasable connection is advantageously provided in a flange region of the airbag-module accommodating housing and the airbag housing, which region protrudes to the rear toward the vehicle interior, as seen in the vehicle longitudinal direction.

The airbag housing, in the fitted state, advantageously has a gap distance from a module carrier situated below it, wherein the gap distance can be approximately 8 to 10 mm. This gap distance ensures a rattle-free arrangement of the airbag module above the module carrier.

In principle, there are various possibilities, depending in each case on a specifically given installation situation, for arranging the airbag-module accommodating housing in the gap region between the instrument panel and the module carrier. Thus, for example, the airbag-module accommodating housing can be fastened to the instrument panel particularly preferably in a pre-assembly process. However, as an alternative or in addition thereto, the airbag-module accommodating housing may also be fixed on the module carrier.

An airbag outlet region of the airbag-module accommodating housing, in the fitted state, is particularly preferably assigned directly to the airbag outlet region in the instrument panel, which results in an excellent inflation behavior for an airbag, in particular in conjunction with a vehicle occupant who is not in a normal sitting position. At least one separating line or predetermined tearing line may be provided on the airbag-module accommodating housing in order to form the airbag outlet region of the airbag-module accommodating housing. According to one particularly preferred embodiment in this regard, the airbag outlet region of the airbag-module accommodating housing is formed in an accommodating-housing upper wall.

Those regions of the accommodating housing and of the instrument panel which form the airbag outlet region of the airbag-module accommodating housing and those which form the airbag outlet region in the instrument panel are particularly preferably situated next to one another in an abutting connection and form a covering flap which can be pivoted up in the direction of the windshield in order to open up the airbag outlet opening. The regions are particularly preferably configured as a material bond, so that just a single covering flap which can be pivoted up is provided. A construction of this type can be produced in a particularly simple manner without a large outlay on components and without a large outlay on material. The covering flap, in the state in which it is swung open, particularly preferably shields a direct impact of the airbag against the windshield, at least at the beginning of the inflation process and, in addition, guides the airbag in the direction of the vehicle interior. With a covering flap of this type, which can be pivoted open in the manner of a fish's mouth, there is therefore also the possibility of directing the airbag in a particularly advantageous manner in the desired direction, i.e. in the direction of the inflation region in front of a vehicle occupant.

In order to prevent the covering flap, during the swinging-open process, from striking against the windshield with a high momentum, retaining devices may be provided which are coupled to the covering flap or covering flaps in such a manner that the latter, in the swung-open state, do not strike against the windshield. For example, at least one stop and/or at least one catch strap or intercepting strap or the like may be provided as the retaining devices. Retaining devices of this type can be produced in a simple manner and have high functional reliability.

According to a particularly preferred embodiment, the airbag-module accommodating housing is connected fixedly to the instrument panel through the use of an abutment region which is adjacent to the airbag outlet region of the airbag-module accommodating housing. This connection can be provided, for example, by a riveting or the like. An abutment region of this type advantageously creates an abutment which keeps the instrument panel in the original shape in this region, i.e. prevents an undesirable mushrooming-up of the instrument panel in the abutment region due to the tearing-open movement in the airbag outlet region of the instrument panel. Overall, a particularly stable and functionally reliable configuration can therefore be provided with an abutment region of this type.

The abutment region may, in principle, be connected integrally to the rest of the airbag-module accommodating housing. However, the abutment region of the airbag-module accommodating housing is particularly preferably configured as a separate component which can be connected to the instrument panel. With a construction of this type, in which the abutment region is configured as a separate component, the abutment region can be connected to the instrument panel by, for example, riveting immediately at the beginning of the installation, in a particularly advantageous manner in terms of the installation. Subsequently, during the further course of the installation, the abutment region can then be connected to the rest of the airbag-module accommodating housing, preferably through the use of a rivet and/or screw and/or clip connection or the like.

In one specific embodiment, the abutment region is of approximately U-shaped configuration and can be connected to the bottom side of the instrument panel by a U-base region.

The abutment region engages with the U-limbs around part of the rest of the airbag-module accommodating housing, preferably in the region of a gas generator accommodated there, and is connected there to the rest of the airbag-module accommodating housing in a particularly simple and also readily accessible manner in terms of installation.

According to a further preferred, specific development, the airbag housing is configured in such a manner that the at least one airbag accommodated therein is provided, in the fitted basic state, laterally next to the at least one gas generator. This results in a flat and compact construction, as is of substantial advantage in particular for a confined installation space in the gap region above a module carrier.

According to a particularly preferred, further embodiment of the invention, at least the front instrument-panel wall region which faces the windshield has, at least in some regions, air passage openings for a diffuse ventilation of the vehicle interior. With such a configuration of the instrument-panel wall region, the air outlet speed in the region of the air passage openings is considerably reduced compared with conventional discharge nozzles, so that drafty ventilation, which is perceived to be unpleasant by the vehicle occupants, due to high air discharge speeds does not occur. With a diffuse ventilation of this type, a pleasant room climate can therefore be created for the vehicle occupants by the vehicle interior being gently supplied with fresh air. In addition, with a diffuse ventilation of this type, the noise level in the vehicle interior can be considerably reduced, since the air no longer flows here into the vehicle interior at a high speed which causes the high noise level, as is the case in conventional discharge nozzles. At the same time, the radiation of heat by the instrument panel as a consequence of insolation can be considerably reduced.

According to one specific embodiment, at least one discharge nozzle is particularly preferably integrated here in a load-bearing basic body of the front instrument panel body, the basic body being covered from above with a covering. This covering is continuously perforated with a perforation pattern in such a manner that a diffuse ventilation can be set via the perforations in the form of air passage openings in the region of the at least one discharge nozzle. At least a subregion of the perforations is provided in conjunction with the basic body situated beneath it through the use of at least one material weakening and/or predetermined breaking point in such a manner that the airbag outlet opening can be formed in it. The, for example, material weakenings can be covered and hidden in an excellent manner with a perforated covering of this type, if this is desired. In addition, the covering can act here with a dual function both as a covering of a basic body in order to form a device for the diffuse ventilation and also as a covering flap for an airbag outlet opening. Particularly preferred here is a construction, in which a cutout is provided in the region of the instrument-panel-side airbag outlet region in the basic body and in which the perforated covering is provided with corresponding predetermined breaking points in this region in order to form at least one covering flap, which can be pivoted up, and covers the cutout from above. A covering flap of this type can be pressed open and overpowered by force in a particularly simple manner with little contact pressure force, so that the initial filling pressure can already be reduced considerably as a result. This likewise makes a considerable contribution to overall reducing the aggressiveness of the airbag.

A particularly optimum application of force to the covering in order to open up the airbag outlet opening is produced if a gas jet of a filling device, preferably of a gas generator, is aimed directly at the airbag outlet region.

Furthermore, a particularly advantageous deployment characteristic of the airbag is provided if the gas jet is blown centrally into the folded-up airbag by the gas generator.

In addition, a particularly advantageous construction is produced if the housing outlet region of the airbag housing is closed through the use of a protective covering which, firstly, keeps the airbag in the folded-up state in the housing and which, secondly, when the airbag is activated, opens up a housing outlet region in a central region, with at least two flap parts being formed, the swung-open flap parts forming, at least in some regions, an edge protection in such a manner that they cover adjacent edge regions. This advantageously avoids damage to the deploying airbag on sharp edges.

In principle, the airbag configuration may be used in different instrument panel regions. However, the airbag configuration is particularly preferably provided as a front passenger airbag in the front passenger region of a vehicle.

According to another feature of the invention, the given safety distance is provided such that, when the airbag has advanced by a distance corresponding to the given safety distance, the filling pressure in the airbag in the potential head impact region is at most substantially 15% of the initial filling pressure, more preferably at most substantially 10% of the initial filling pressure, and most preferably at most substantially 5% of the initial filling pressure.

According to yet another feature of the invention, the given safety distance is at least substantially 10 cm, more preferably the given safety distance is at least substantially 15 cm, and most preferably the given safety distance is at least substantially 20 cm depending on a particular impact situation.

According to a further feature of the invention, the airbag has an initial filling pressure substantially between 30 bar and 35 bar and, after advancing by a distance of approximately 100 mm, has a filling pressure substantially between 2.5 bar and 3.5 bar, and preferably, after advancing by a distance of substantially 200 mm, has a filling pressure substantially between 1.5 bar and 2.5 bar.

According to yet a further feature of the invention, the given safety distance, when viewed in cross section through the instrument panel, is substantially a straight, shortest path between a periphery of the potential head impact region facing the airbag outlet opening and a periphery of the airbag outlet opening facing the potential head impact region.

According to yet another feature of the invention, there is provided, an airbag module having an airbag housing and a gas generator; the airbag being part of the airbag module, the airbag and the gas generator being accommodated in the airbag housing, the gas generator being assigned to the airbag, as a filling device; and the airbag housing being formed with a housing outlet region for the airbag, the housing outlet region being assigned to the instrument-panel-side airbag outlet wall region.

According to a further feature of the invention, there is provided, an airbag-module accommodating device disposed below the instrument-panel-side airbag outlet wall region; and the airbag module, when in an installed position, being releasably connected to the airbag-module accommodating device for securing the airbag module in the installed position.

According to yet a further feature of the invention, there is provided, a guide device, the airbag module being configured to be connected to the airbag-module accommodating device via the guide device.

According to yet another feature of the invention, the vehicle defines a vehicle vertical axis and a vehicle longitudinal axis; a module carrier is disposed such that a gap region is provided between the instrument-panel-side airbag outlet wall region and the module carrier; and the airbag module is configured to be guided by the guide device such that the airbag module can be pushed substantially from below the module carrier, as seen in a direction of the vehicle vertical axis, and substantially from behind the module carrier, as seen in the direction of the vehicle longitudinal axis, into a fixed position in the gap region between the instrument-panel-side airbag outlet wall region and the module carrier.

According to a further feature of the invention, the guide device is configured as a slotted guide configuration having a guide slot and a guide pin guided therein as a sliding block.

According to yet a further feature of the invention, the airbag housing is a box-shaped airbag housing with airbag-housing side walls disposed opposite one another in a direction of a vehicle transverse axis; the airbag-module accommodating device is configured as an airbag-module accommodating housing with accommodating-housing side walls assigned to the airbag-housing side walls; the airbag housing, when in a pushed-in state, is enclosed by the accommodating-housing side walls; and the guide device is formed at the accommodating-housing side walls and the airbag-housing side walls such that a respective first guide element, disposed on each of the airbag-housing side walls, interacts with a respective second guide element correspondingly formed on the accommodating-housing side walls.

According to yet another feature of the invention, the guide slot is formed on the airbag-module accommodating device and the guide pin is formed on the airbag housing.

According to a further feature of the invention, a module carrier is disposed such that a gap region is provided between the instrument-panel-side airbag outlet wall region and the module carrier; the guide slot has a first slot region extending obliquely upward in a rear side-wall region of one of the accommodating-housing side walls, the rear side-wall region is disposed at a rear in relation to the instrument panel, as seen in a direction of a vehicle longitudinal axis, and protrudes substantially rearward over the module carrier; the first slot region starts from a bottom side-wall edge region of the one of the accommodating-housing side walls, disposed at a bottom in relation to a direction of a vehicle vertical axis, and the first slot region reaches a top side-wall region of the one of the accommodating-housing side walls, disposed at a top in relation to a direction of the vehicle vertical axis; and the guide slot has a second slot region directly adjoining the first slot region, the second slot region extends, starting from the first slot region, forward, as seen in the vehicle longitudinal direction, in a front side-wall region of the one of the accommodating-housing side walls, the front side-wall region is disposed at a front in relation to the instrument panel, as seen in a direction of the vehicle longitudinal axis.

According to yet a further feature of the invention, the second slot region extends forward substantially horizontally at a beginning and then extends forward with a rising angle relatively smaller than a rising angle of the first slot region.

According to another feature of the invention, a substantially horizontal subregion of the second slot region extends substantially above the module carrier.

According to yet another feature of the invention, the airbag-module accommodating device is configured as an airbag-module accommodating housing with accommodating-housing side walls; and the guide slot extends substantially over an entire length of one of the accommodating-housing side walls, as seen in a direction of a vehicle longitudinal axis.

According to a further feature of the invention, the airbag-module accommodating device is configured as an airbag-module accommodating housing with accommodating-housing side walls disposed opposite one another; and the guide slot and a further guide slot are formed respectively identically on the accommodating-housing side walls.

According to yet a further feature of the invention, the airbag housing is a box-shaped airbag housing with airbag-housing side walls disposed opposite one another in a direction of a vehicle transverse axis; and the guide pin is disposed in a front region of one of the airbag-housing side walls, wherein the front region faces the instrument panel.

According to another feature of the invention, a front end of the guide-slot assigned to the instrument panel is configured as a latching socket; and the guide pin latches releasably into the latching socket when the airbag module is in a pushed-in end position.

According to yet another feature of the invention, the latching socket is configured as a U-profile; and the guide pin is accommodated in the U-profile when the airbag module is in the pushed-in end position.

According to a further feature of the invention, the guide pin is clamped in the guide slot such that the guide pin can be displaced only when a given clamping force, operating as a resistance force against the guide pin being pushed in, is exceeded.

According to yet a further feature of the invention, the airbag-module accommodating housing has an accommodating-housing upper wall; and the airbag housing of the airbag module, when inserted in the airbag-module accommodating housing, is accommodated substantially in a form-fitting manner therein, and the accommodating-housing upper wall covers the airbag housing from above.

According to yet another feature of the invention, there is provided, a releasable connecting element for connecting the airbag housing to the airbag-module accommodating housing in an installation region which is readily accessible from below and, in relation to the instrument panel, is situated in a direction toward the vehicle interior, when viewed in a direction of a vehicle longitudinal axis.

According to another feature of the invention, the releasable connecting element is a clip connection or a screw connection.

According to a further feature of the invention, the airbag-module accommodating housing and the airbag housing have a flange region projecting rearward in a direction of the vehicle interior, when viewed in a direction of the vehicle longitudinal axis; and the releasable connecting element is disposed in the flange region.

According to yet a further feature of the invention, there is provided, a module carrier disposed below the airbag housing such that a gap distance is provided between the module carrier and the airbag housing when the airbag housing is in a mounted state.

According to yet another feature of the invention, a module carrier is disposed below the airbag housing such that a gap distance of substantially 8 to 10 mm is provided between the module carrier and the airbag housing when the airbag housing is in a mounted state.

According to another feature of the invention, a module carrier is disposed below the airbag housing such that a gap distance is provided between the module carrier and the airbag housing when the airbag housing is in a mounted state; and the airbag-module accommodating housing is configured to be fixed to the instrument panel and/or the module carrier.

According to a further feature of the invention, the airbag-module accommodating housing has an airbag outlet region assigned to the instrument-panel-side airbag outlet wall region when the airbag-module accommodating housing is in a mounted state.

According to yet a further feature of the invention, the airbag-module accommodating housing has a separating line or predetermined tearing line in order to form the airbag outlet region of the airbag-module accommodating housing.

According to yet another feature of the invention, the airbag-module accommodating housing has an accommodating-housing upper wall; and the airbag outlet region of the airbag-module accommodating housing is formed in the accommodating-housing upper wall.

According to another feature of the invention, the airbag outlet region of the airbag-module accommodating housing and the front instrument panel wall region configured as the instrument-panel-side airbag outlet wall region are disposed next to one another in an abutting connection and form a covering flap which can be pivoted up in a direction toward the windshield to open up the airbag outlet opening.

According to another feature of the invention, the airbag outlet region of the airbag-module accommodating housing and the front instrument panel wall region configured as the instrument-panel-side airbag outlet wall region form a material bond.

According to yet another feature of the invention, the covering flap, when in a swung open state, shields the windshield from a direct impact of the airbag, at least at a beginning of an inflation, and guides the airbag towards the vehicle interior.

According to a further feature of the invention, there is provided, a retaining device coupled to the covering flap such that the covering flap, when in a swung-open state or while being swung open, does not strike against the windshield.

According to yet a further feature of the invention, the retaining device is a stop and/or a catch strap.

According to another feature of the invention, the airbag-module accommodating housing has an abutment region disposed adjacent to the airbag outlet region of the airbag-module accommodating housing; and the airbag-module accommodating housing is fixedly connected to the instrument panel via the abutment region.

According to yet another feature of the invention, the airbag-module accommodating housing is riveted to the instrument panel.

According to a further feature of the invention, the abutment region of the airbag-module accommodating housing is configured as a separate component and is configured to be connected to the instrument panel.

According to yet a further feature of the invention, the abutment region, as a separate component, is configured to be first connected to the instrument panel and then, during a further course of installation, to a remaining portion of the airbag-module accommodating housing.

According to another feature of the invention, the abutment region as a separate component is configured to be connected to the remaining portion of the airbag-module accommodating housing via a rivet, a screw, and/or a clip connection.

According to yet another feature of the invention, the abutment region is a U-shaped configuration with a U-base region and U-limbs, the U-base region is configured to be connected to a lower side of the instrument panel; and the U-limbs of the abutment region surround a part of a remaining portion of the airbag-module accommodating housing for connecting the abutment region to the remaining portion of the airbag-module accommodating housing.

According to a further feature of the invention, the part of the remaining portion of the airbag-module accommodating housing accommodates the gas generator.

According to another feature of the invention, at least a part of the potential head impact region of the instrument panel is made from an energy-absorbing material.

According to yet another feature of the invention, the potential head impact region of the instrument panel is made from a deformable material, the deformable material being configured to absorb energy when being deformed; and the instrument panel providing a deformation space in a region below the potential head impact region such that, when a head impacts against the potential head impact region, the potential head impact region can be deformed in an unobstructed manner into the deformation space with energy being absorbed.

According to a further feature of the invention, at least the potential head impact region of the instrument panel includes a backing layer of energy-absorbing foam and a slush skin covering the backing-layer.

According to another feature of the invention, there is provided, a gas generator and an airbag housing for accommodating the airbag, the airbag housing being configured such that the airbag, when in the folded-up basic state, is disposed laterally next to the gas generator.

According to yet another feature of the invention, there is provided, a gas generator and an airbag housing having an airbag housing region and a gas-generator housing region, the airbag housing region accommodating the airbag, the gas-generator housing region accommodating the gas generator; the airbag housing having a connecting region between the airbag housing region and the gas-generator housing region; and the connecting region has a weakened point, for example a material weakening and/or a predetermined breaking point, such that, when force is applied to the gas-generator housing region or the airbag housing region, the weakened point breaks in order to prevent a deformation region of the instrument panel from becoming a solid barrier.

According to a further feature of the invention, the potential head impact region of the head-impact instrument panel wall region is configured to be deformable; the gas-generator housing region protrudes at least partly into the potential head impact region; and the connecting region between the airbag housing region and the gas-generator housing region is configured to break at the weakened point when force is applied to the gas-generator housing region.

According to yet a further feature of the invention, at least the front instrument panel wall region, which faces the windshield, has, at least in some regions thereof, air passage openings formed therein for a diffuse ventilation of the vehicle interior.

According to yet another feature of the invention, the front instrument panel wall region has a load-bearing basic body; a discharge nozzle is integrated in the load-bearing basic body of the front instrument panel wall region; a perforated covering covers the load-bearing basic body from above, the perforated covering has perforations formed therein for providing the air passages openings, the perforations form a continuous perforation pattern for providing a diffuse ventilation at the discharge nozzle via the perforations; and at least a portion of the perforated covering, in combination with the load-bearing basic body situated underneath the perforated covering, has at least one weakened point, such as a material weakening and/or a predetermined breaking point, for providing the airbag outlet opening.

According to a further feature of the invention, the load-bearing basic body has a cutout formed therein, the cutout is located in the instrument-panel-side airbag outlet wall region; and the perforated covering covers the cutout from above and has at least one weakened point at the cutout, such as a material weakening and/or a predetermined breaking point, for forming a pivotable covering flap.

According to another feature of the invention, a filling device is configured to provide a gas jet aimed directly at the instrument-panel-side airbag outlet wall region.

According to yet another feature of the invention, the filling device is a gas generator.

According to a further feature of the invention, there is provided, a gas generator configured to provide a gas jet directed from below centrally into the airbag for unfolding the airbag.

According to yet a further feature of the invention, there is provided, a protective covering for covering the housing outlet region of the airbag housing; the protective covering holds the airbag in the airbag housing when the airbag is in the unactivated, folded-up state and, when the airbag is in the activated state, the protective covering centrally opens up a housing outlet opening such that at least two flap parts are formed and such that the flap parts, when swung-open, at least partly cover adjacent edge regions of the housing outlet region for providing an edge protection.

According to yet another feature of the invention, an installation clearance is provided below the potential head impact region of the instrument panel toward the vehicle interior when viewed in a direction of a vehicle longitudinal axis; and an air duct is provided in the installation clearance.

According to a further feature of the invention, the air duct is integrally formed with the lower side of the instrument panel.

According to another feature of the invention, an underside side wall region of the instrument panel forms part of an air duct wall.

According to another feature of the invention, the instrument panel and the airbag form a front-passenger airbag configuration in a front passenger region of the vehicle.

According to yet another feature of the invention, the instrument panel is a motor vehicle instrument panel.

Other features which are considered as characteristic for the invention are set forth in the appended claims.

Although the invention is illustrated and described herein as embodied in an airbag configuration in a vehicle, in particular a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
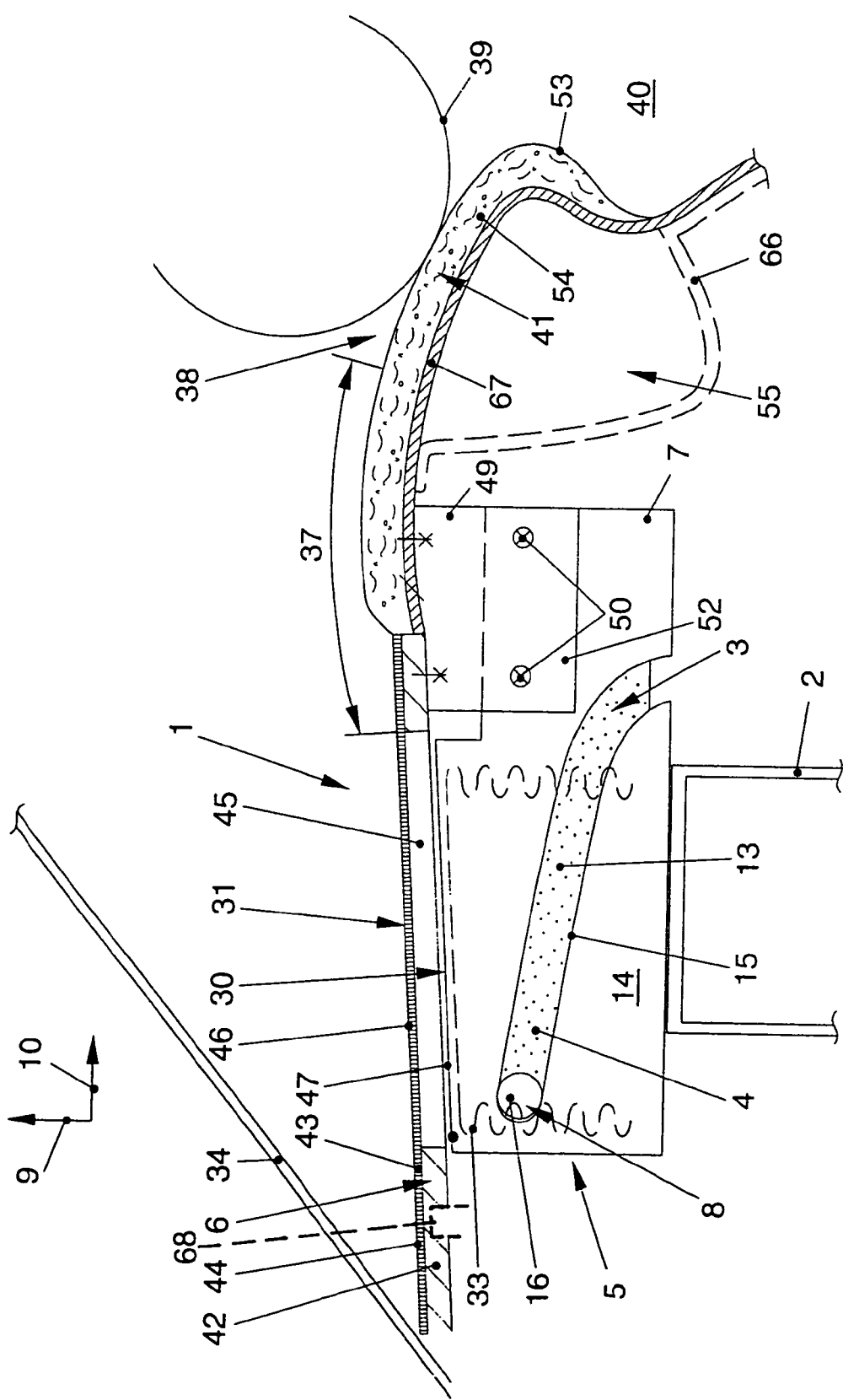
FIG. 1 is a diagrammatic, partial sectional view of an instrument panel in a front passenger region having an airbag configuration according to the invention, in an unactivated basic state of the airbag configuration.

Referring now to the figures of the drawings in detail and first, particularly, to FIG. 1 thereof, there is shown a cross section through an instrument panel 6 in a front passenger region of a motor vehicle in conjunction with an airbag configuration 1 according to the invention above a module carrier 2 of a motor vehicle, which is configured as a cross member. The airbag configuration 1 has an airbag module 3 which, in turn, includes an airbag housing 4, in which a gas generator and an airbag 33, illustrated here merely by dashed lines, are accommodated in the folded-up basic state.

The airbag module 3 is arranged here in a gap region 5 between a lower side region of the instrument panel 6 and an upper side region, assigned thereto, of the module carrier 2. For this purpose, an airbag-module accommodating housing 7 is provided in the region above the module carrier 2 and, as is apparent in particular also from FIGS. 4 and 5, the airbag module 3 can be pushed out from it and/or pushed into it under guidance through the use of a guide device 8 essentially from below the module carrier 2, as seen in the direction of the vehicle vertical axis 9, and essentially from behind the module carrier 2, as seen in the direction of the vehicle longitudinal axis 10, as is shown diagrammatically in FIG. 5 by the two arrows 11 and 12. This will be explained once again in more detail further below.

Figure 4:
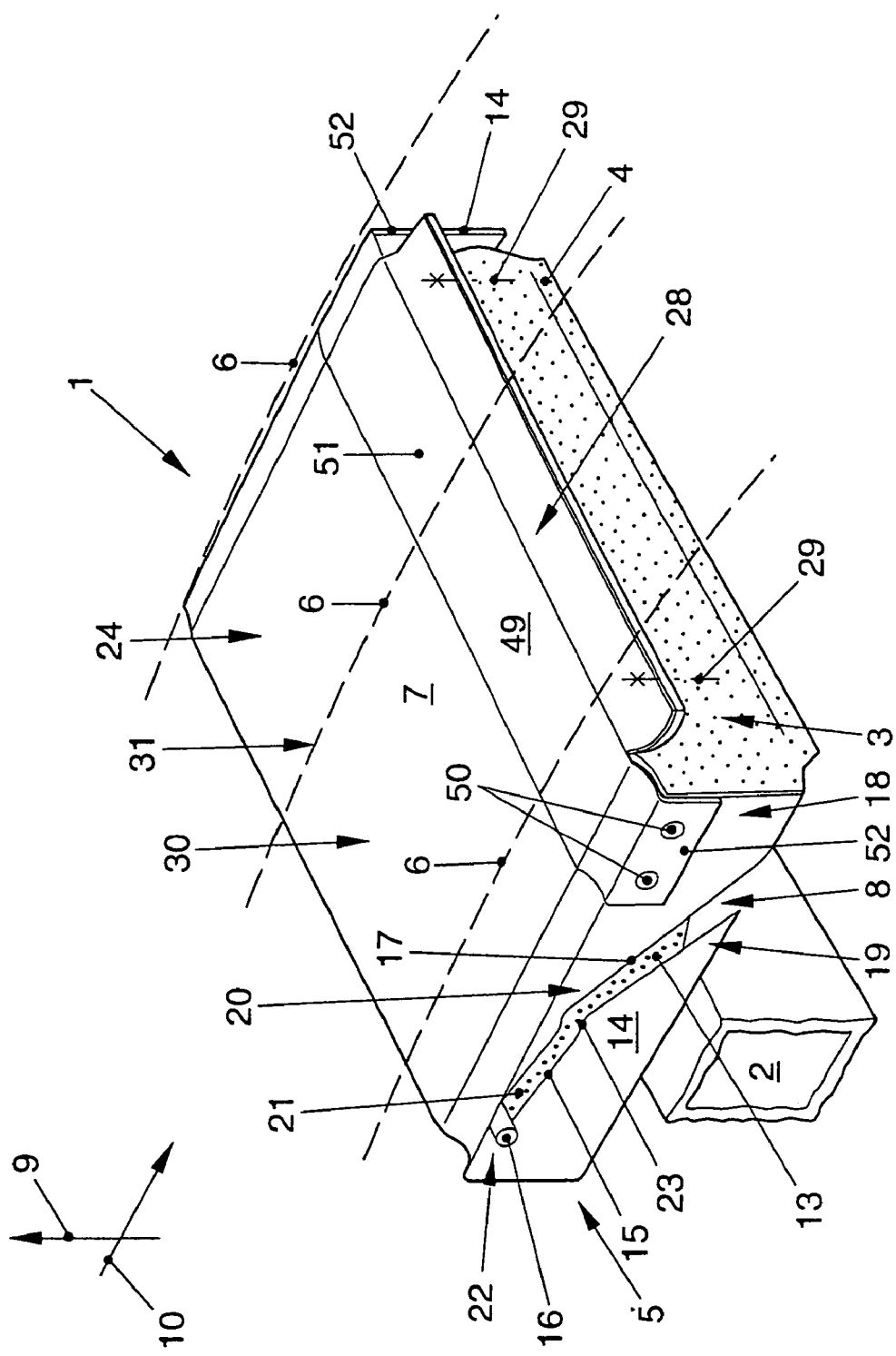
FIG. 4 is a diagrammatic, perspective view of an airbag housing accommodated in an airbag-module accommodating housing according to the invention.
Figure 5:
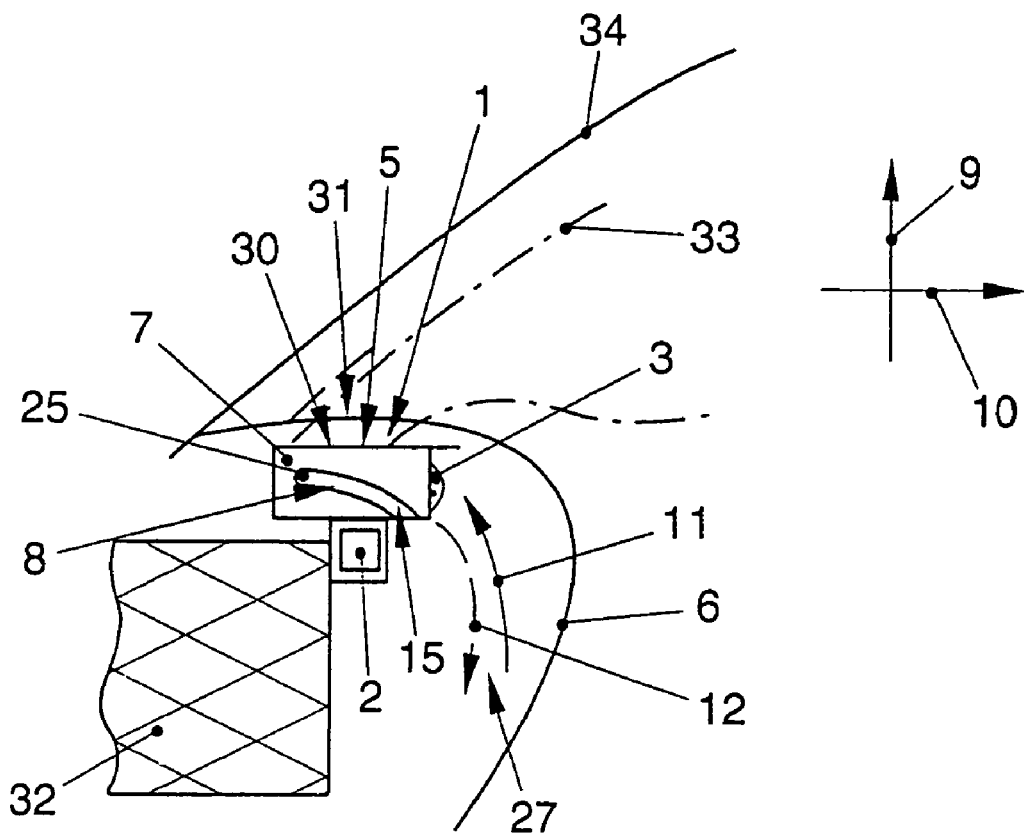
FIG. 5 is a diagrammatic sectional view of a front-end region of a vehicle for illustrating the installation situation of the airbag configuration according to the invention.

In FIG. 1 and in FIG. 5, the airbag module 3 is shown in the completely pushed-in state. It is apparent, in particular from FIG. 4, that the airbag housing 4 is a box-shaped construction with opposite airbag-housing side walls 13. In the pushed-in state of the airbag module 3, the airbag housing 4 is engaged around by accommodating-housing side walls 14 which are assigned to the airbag-housing side walls 13, with a guide slot 15 being formed in each of the accommodating-housing side walls 14, the guide slot being assigned a guide pin 16 on the airbag housing 4 as a further part of the guide device 8.

The guide slot 15 is guided obliquely upward on the accommodating-housing side wall 13 through the use of a first slot region 17 in a side wall region 18 which is at the rear in relation to the instrument panel 6, as seen in the direction of the vehicle longitudinal axis 10, which region protrudes essentially to the rear over the module carrier 2, starting from a side-wall edge region 19 which is at the bottom in relation to the direction of the vehicle vertical axis 9 until it reaches a side wall region 20 which is at the top in relation to the direction of the vehicle vertical axis 9. The guide slot 15 is guided forward, as seen in the direction of the vehicle longitudinal axis 10, on the accommodating-housing side wall 13 through the use of a second slot region 21, which directly adjoins the first slot region 17 until it approximately reaches a front side wall region 22. In this case, the second slot region 21, as is shown merely diagrammatically in FIG. 4, is guided forward first of all essentially horizontally and then subsequently with a smaller rising angle in comparison with the first slot region. This horizontal slot region 23 extends essentially above the module carrier 2. FIG. 5 shows an alternative slot configuration, in which the slot is guided upward, preferably approximately rectilinearly from the bottom at the rear. A further, alternative slot configuration is shown in FIG. 1.

In the illustration of FIG. 4, the instrument panel 6 is shown merely diagrammatically and with dashed lines for reasons of clarity. Furthermore, the airbag housing 4 is provided with dots to more easily differentiate it from the airbag-module accommodating housing 7, in which the airbag housing 4, in the pushed-in state, is accommodated in an approximately form-fitting manner, an accommodating-housing upper wall 24 covering and overlapping the airbag housing 4 from above, preferably in an abutting connection.

The guide pins 16 are arranged on the opposite airbag-housing side walls 13 in each case in a front airbag-housing side wall region which is assigned to a windshield 34.

Figure 6:
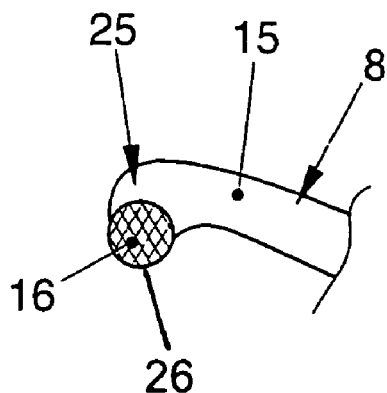
FIG. 6 is a diagrammatic, enlarged view of a latching socket on a guide slot end according to the invention.

As is shown merely diagrammatically in FIG. 6, the front guide-slot end 25 can be configured as a latching socket 26 into which the guide pin 16 can be releasably latched in the pushed-in end position of the airbag module 3.

As is apparent in particular from FIG. 1 and FIG. 4, the airbag housing 4, in the fitted state, is preferably disposed at a gap distance from the module carrier 2 which is, for example, approximately 8 to 10 mm.

As is furthermore apparent in particular from FIG. 4, the airbag housing 4 can be connected to the airbag-module accommodating housing 7 in a flange region 28 through the use of at least one screw connection 29. In the fitted state of the airbag configuration 1, as is apparent in particular from FIG. 5, this flange region 28 is arranged in an installation region 27 which is readily accessible from below and, in relation to the direction of the vehicle longitudinal axis 10, is situated behind the module carrier 2, as seen in the direction toward the vehicle interior.

The module carrier 2 runs here as a vehicle cross member between opposite A-pillars in a region approximately level with a heating and air-conditioning unit 32, which is illustrated merely extremely diagrammatically in the illustration of FIG. 5.

As is shown in FIG. 5 merely diagrammatically and by way of example for one application case, the heating and air-conditioning unit 32 and also the direct arrangement of the airbag module 3 in the region above the module carrier 2 in the gap region 5 obstruct the simple removal and installation of the airbag module, in particular in a customer service situation. With the airbag configuration 1 according to the invention, with previous release of the screw connections 29, which are readily accessible in the installation region 27, between the airbag housing 4 and the airbag-module accommodating housing 7, the guide device 8 can be used to remove and also fit the airbag module again in a simple manner corresponding to the arrows 11, 12 without the instrument panel having to be removed for this purpose to give access to the airbag housing.

The slot geometry of the guide slot 15 shown in FIG. 4 is selected here by way of example in such a manner that, after the guide pins 16 have been inserted into the associated guide slots 15, they are guided along the first slot region 17 initially relatively steeply and obliquely upward toward the front side wall region 22. In order subsequently to prevent, for example, the airbag housing 4 from being blocked or obstructed in the region of the airbag configuration 1 on the module carrier 2, a secure positioning of the airbag housing 4 in the airbag-module accommodating housing 7 is obtained by the airbag housing being displaced along the horizontal slot region 23 and along that further region of the second slot region 21 which adjoins it to the front, the accommodating housing 7 surrounding the airbag housing 4 essentially in a form-fitting manner to provide a compact construction.

As can be gathered in particular from FIG. 1, the airbag module 3, and therefore, in particular, the airbag 33, is arranged in the unactivated, folded-up basic state, as is illustrated in FIG. 1, behind a front instrument-panel wall region, which is assigned to the windshield 34, as the instrument-panel-side airbag outlet wall region 31. An airbag outlet opening 36, which can be formed in this instrument-panel-side airbag outlet wall region 31 and is illustrated in FIG. 2, which shows the activated state of a construction according to FIG. 1, is disposed at a predeterminable safety distance 37 from a potential head impact region 38 of a head 39 of a vehicle occupant in a head-impact instrument panel region 41 adjoining the instrument-panel-side airbag outlet region 31 as the front instrument panel region away from the windshield 34 in the direction of the vehicle interior 40.

The safety distance 37 is predetermined here in such a manner that the airbag 33, in the activated state (illustrated diagrammatically in FIGS. 2 and 3), after having advanced by a distance in the direction of the vehicle interior 40 which corresponds to the safety distance 37 between the airbag outlet opening 36 and the potential head impact region 38, has a gas pressure as a filling pressure which is reduced in accordance with predetermined limit values in comparison with the initial gas pressure in the airbag 33 at the beginning of the airbag activation. As is apparent from FIGS. 1 to 3, the safety distance 37 (seen here in cross section) is, for example, approximately the straight, shortest connecting line or path between the start of the potential head impact region 38 and the start of the airbag outlet opening 36.

Figure 9:
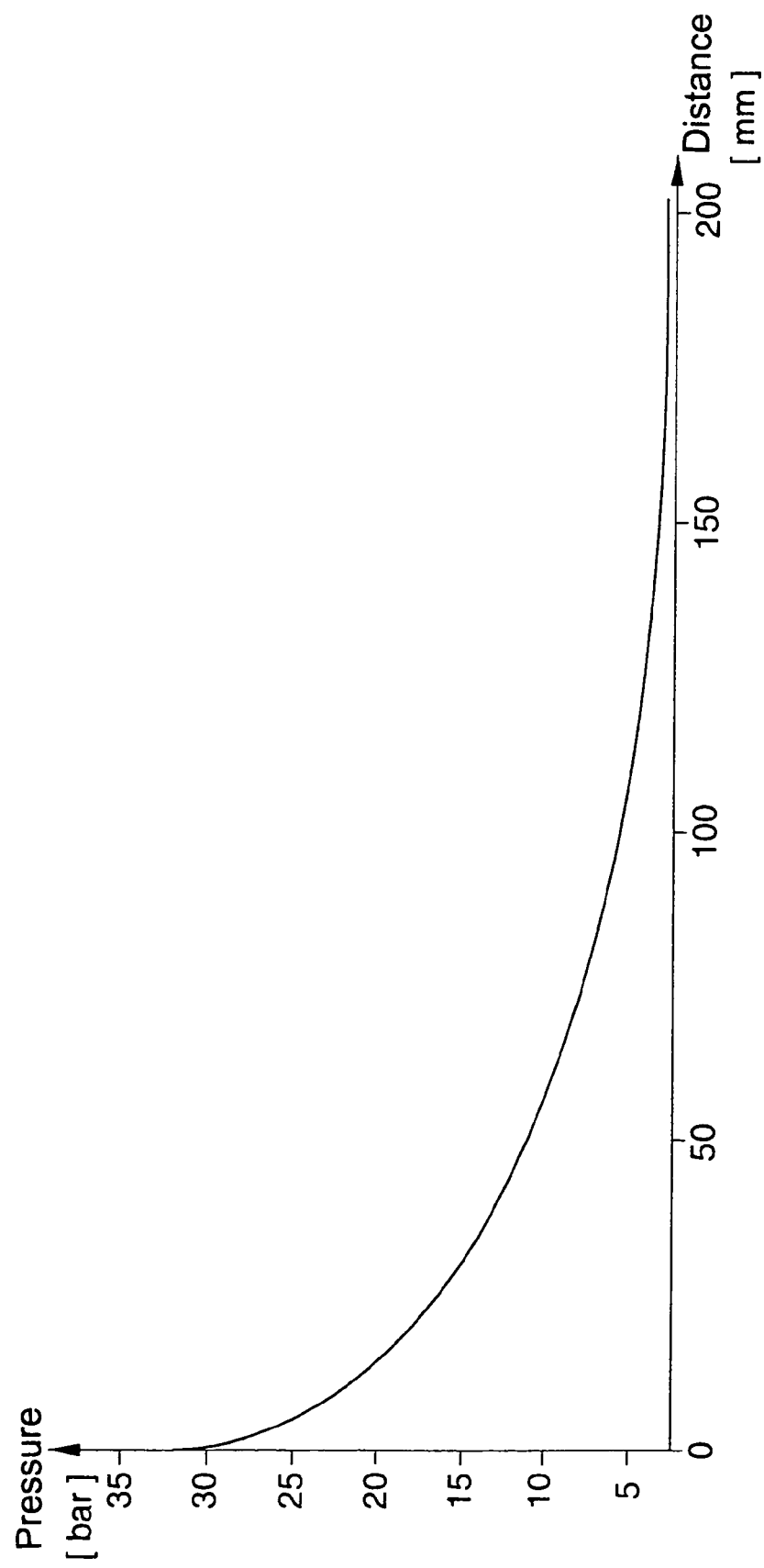
FIG. 9 is a diagram of the internal pressure of the airbag over the travel distance of the airbag in accordance with the invention.

As can be gathered from the diagram of FIG. 9, in which the airbag pressure is shown over the airbag travel distance, the high initial filling pressure of approximately 30 bar is already reduced to a pressure of approximately 3 bar in particular in the first centimeters, i.e. in particular after the airbag has advanced by a distance of approximately 100 mm. Approximately from an advancing distance of 120 mm, a pressure for example of approximately 2 bar is obtained in the airbag, the pressure corresponding to the minimum pressure present in the airbag at the end of the inflation process. That is to say, the airbag aggressiveness which is present because of the filling process and the high filling pressure associated therewith is already considerably reduced at a safety distance of approximately 120 mm. As a result, depending on the given installation conditions, a considerable reduction in the risk of injury for vehicle occupants, such as children, who are out-of-position can already be obtained, for example, from a safety distance of approximately 100 mm between the airbag outlet opening 36 and the head impact region 38, since the aggressiveness of the airbag 33, which is caused by the high initial filling pressure, is reduced virtually to the minimum value after passing through the safety distance 37.

Figure 2:
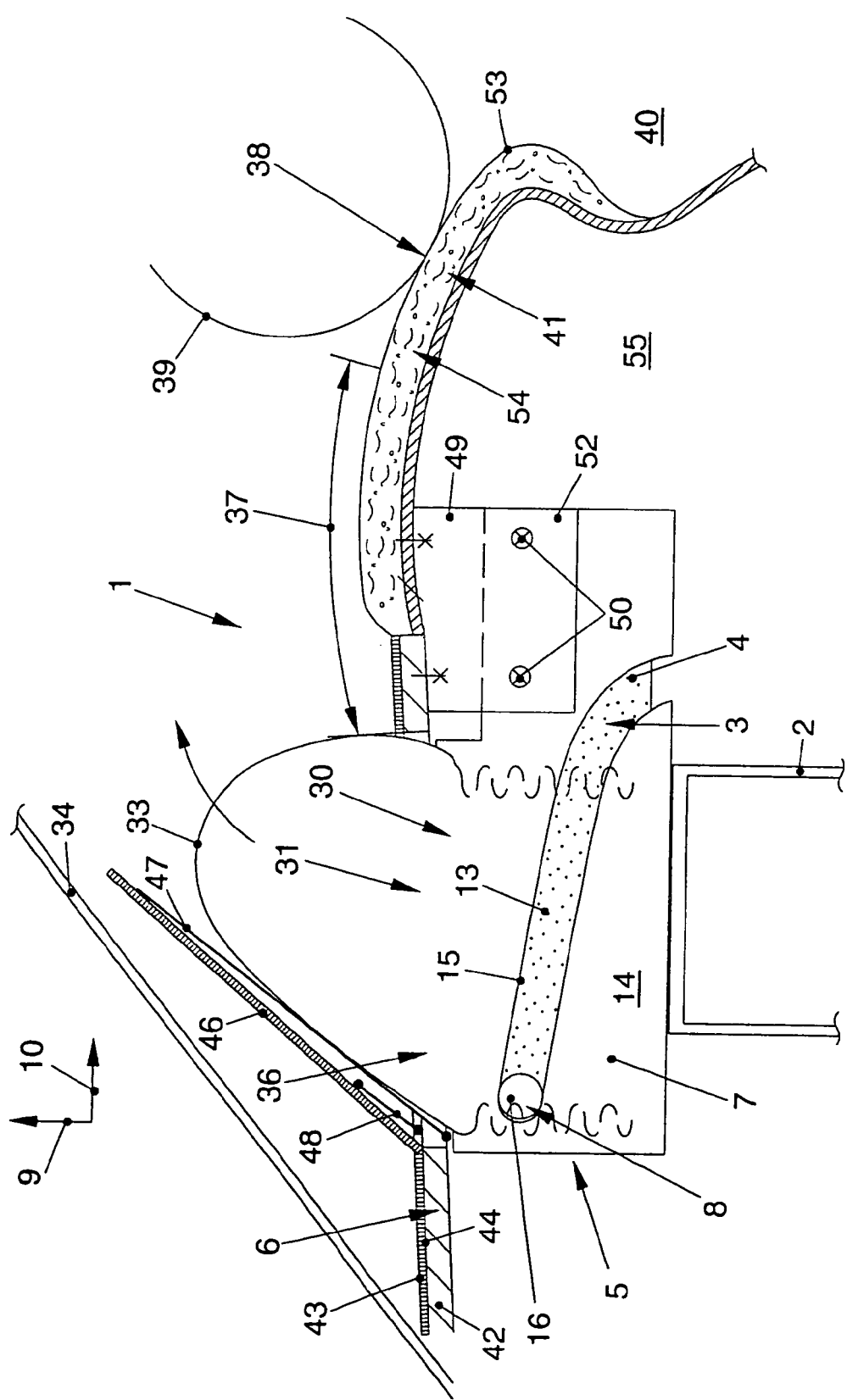
FIG. 2 is a diagrammatic, partial sectional view of an instrument panel as shown in FIG. 1 at the beginning of the airbag activation according to the invention.
Figure 3:
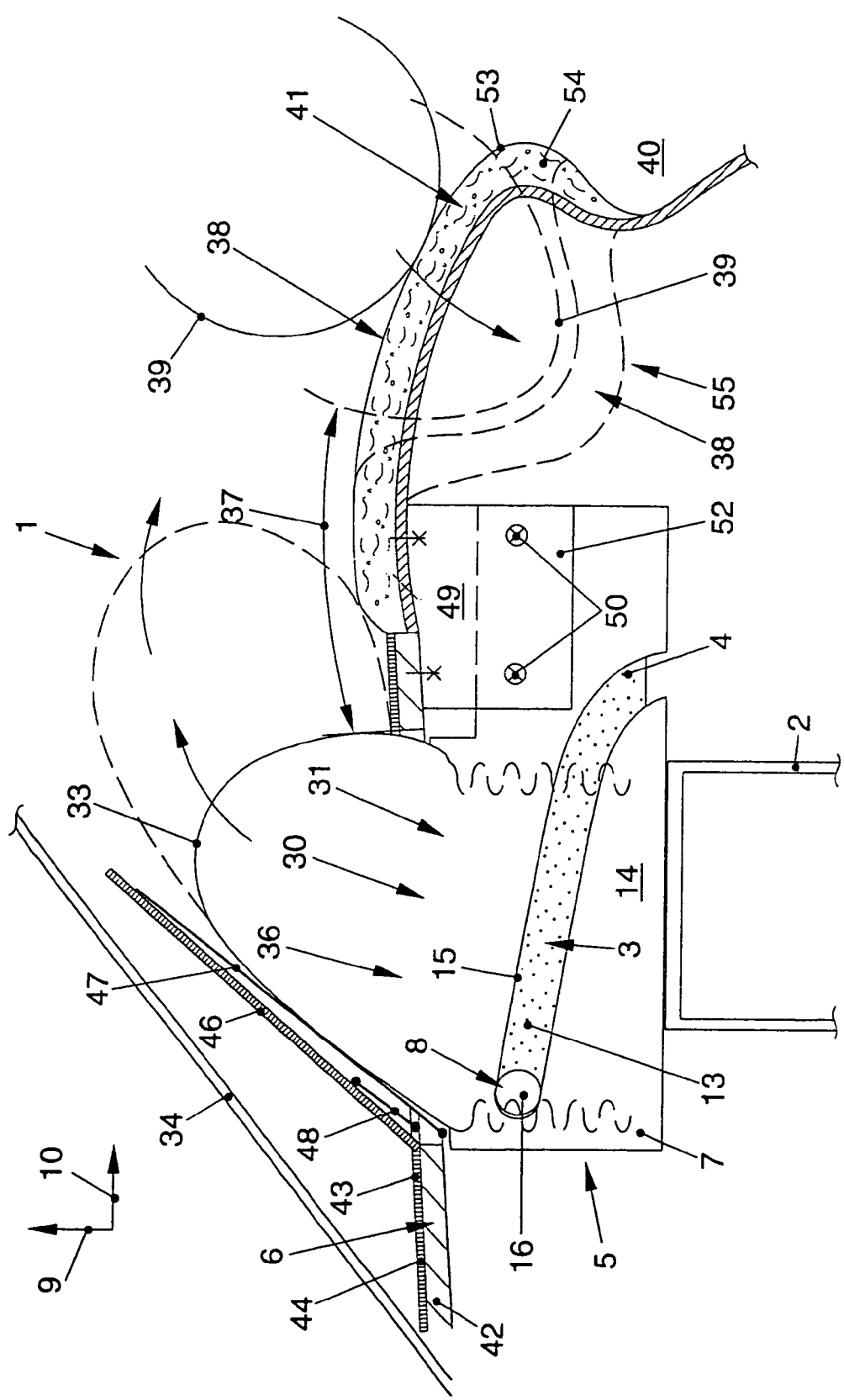
FIG. 3 is a diagrammatic, partial sectional view of an instrument panel as shown in FIGS. 1 and 2 during the further course of the airbag activation according to the invention.

As can be gathered from FIGS. 1 to 3 and also FIG. 5, an airbag outlet region 30 of the airbag-module accommodating housing 7, in the fitted state, is assigned to the instrument-panel-side airbag outlet wall region 31.

As can furthermore be gathered from FIGS. 1 to 3, at least the front instrument panel region, which faces the windshield 34, as the instrument-panel-side airbag outlet region 31 can be formed from a load-bearing basic body 42 in which at least one discharge nozzle 68, which is only schematically indicated, is integrated. The basic body 42 is covered from above by a covering 43 which is continuously perforated with a perforation pattern in such a manner that a diffuse ventilation can be achieved via the perforations 44 as air passage openings at least in the region of the at least one discharge nozzle. A cutout 45 is provided in the basic body 42 in the region of the instrument-panel-side airbag outlet wall region 31. In addition, the perforated covering 43 is provided in this region with predetermined breaking points in order to form a covering flap 46 (illustrated in FIGS. 2 and 3) which can be pivoted up and is intended for opening up the airbag outlet opening 36, the covering 43 covering the cutout 45 from above in the unactivated state, as illustrated in FIG. 1, to provide a continuous, uniform appearance.

In the event of the airbag activation, the airbag 33 then presses with its high initial filling pressure of, for example, 30 bar against a covering flap 47, which can be formed in the accommodating-housing-side airbag outlet region 30 and which, in turn, presses against the covering flap 46, which can be formed in the instrument-panel-side airbag outlet region 31, so that these covering flaps 46, 47 swing open in the manner of a fish's mouth (in the diagrammatic manner shown in FIGS. 2 and 3) and open up the airbag outlet opening 36 for inflation of the airbag 33 in the vehicle interior 40.

In order to prevent the covering flap 46, while it is pivoting up, from striking against the windshield 34, retaining devices, for example a catch strap 48, are provided in the region of the airbag outlet opening 36 and limit the angle to which the covering flaps 46, 47 pivot up. In addition, a certain inflation direction of the airbag 33 toward the vehicle interior 40 can be predetermined with a certain setting angle of the covering flaps 46, 47, as is indicated in particular diagrammatically in FIG. 3.

The covering flap 47 is part of the airbag-module accommodating housing 7, which may also be referred to as a firing channel. As is furthermore apparent from FIGS. 1 to 4, the airbag-module accommodating housing 7 is a two-part configuration, including an abutment region 49 as a separate component which is connected to the lower side (bottom side) of the instrument panel right at the beginning of the installation by riveting, for example. During the further course of the installation, the rest of the airbag-module accommodating housing, in which the covering flap 47 can be formed, is then connected to the abutment region 49, for example through the use of conventional screw connections 50. As is apparent in particular from FIG. 4, the abutment region 49 is a U-shaped configuration, with a U-base region 51 which is connected to the lower side of the instrument panel. The abutment region 49 engages with the U-limbs 52 around a subregion of the rest of the airbag-module accommodating housing 7, here preferably in the region above a gas generator accommodated there, and is fixed there through the use of the screw connections 50.

As an alternative or in addition thereto, the airbag-module accommodating housing may, however, also be fixed on the module carrier 2, as is shown merely extremely diagrammatically and by way of example in the illustration of FIG. 5.

As can furthermore be gathered from FIGS. 1 to 3, the potential head impact region 38 of the instrument panel 6 may partially be produced from a material which can be deformed with energy being absorbed, for example from a backing layer 54 of energy-absorbing foam covered by a slush skin 53. In the region situated below the potential head impact region 38 of the instrument panel 6, a deformation space 55 is formed, into which the potential head impact region 38 of the instrument panel 6, as shown merely diagrammatically and by dashed lines in FIG. 3, can be deformed without obstruction, with energy being absorbed.

Figure 7:
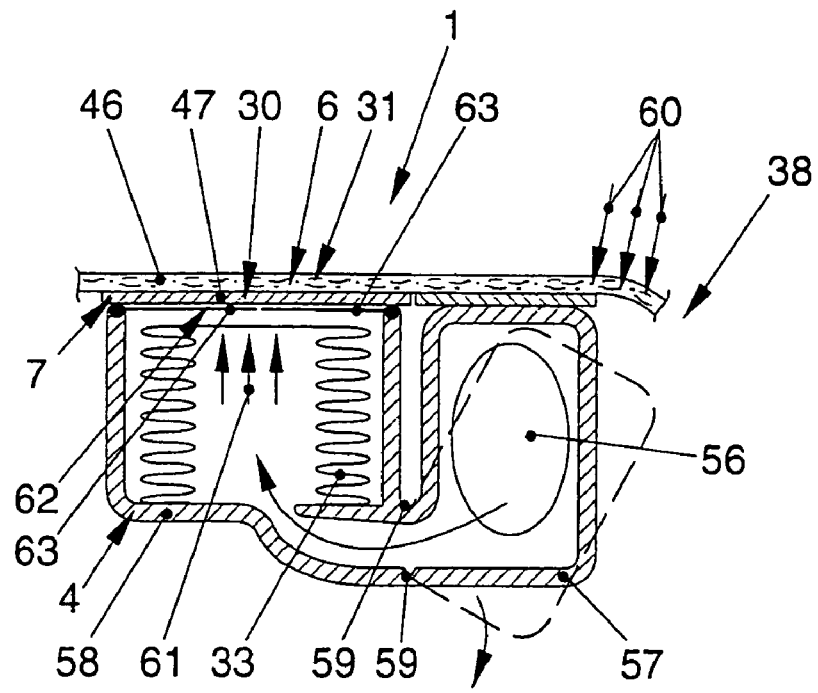
FIG. 7 is a diagrammatic sectional view of an airbag module having airbag housing parts connected to one another via predetermined breaking points according to the invention.
Figure 8:
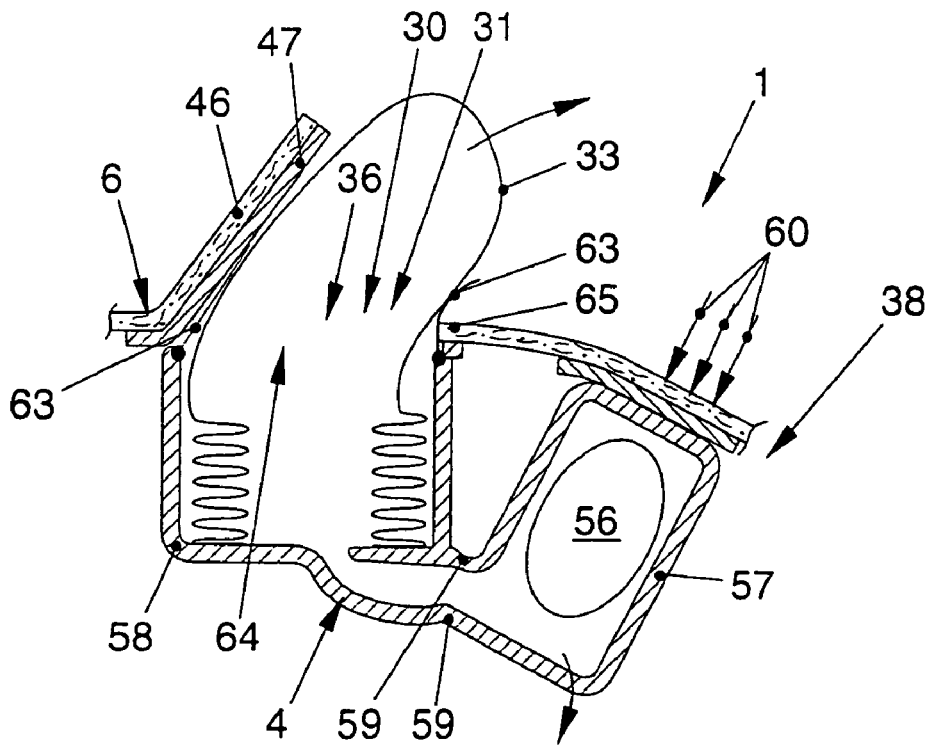
FIG. 8 is a diagrammatic sectional view of the airbag module according to the invention as shown in FIG. 7 during a further course of a force loading.

In particular for the situation in which there are confined installation conditions, and at least one subregion of the airbag housing 4, for example a gas-generator housing region 57 accommodating a gas generator 56, as illustrated in FIGS. 7 and 8, protrudes, with an edge thereof, into the potential head impact region 38, provision may be made for this gas-generator housing region 57 to be connected, for example via predetermined breaking points 59, to an airbag housing region 58 which accommodates the airbag 33. The effect achieved by this is that, when a force, which is illustrated by the arrow 60 in FIGS. 7 and 8, is applied to the deformably configured, potential head impact region 38 of the instrument panel 6 and there is an impact contact of the deforming subregion with the gas-generator housing region 57, the gas-generator housing region 57 buckles or breaks along the predetermined breaking lines as is illustrated by dashed lines in the illustration of FIG. 7 and by solid lines in the illustration of FIG. 8. This considerably reduces the risk of the deformation region forming a solid barrier.

Furthermore, it is particularly readily apparent in FIGS. 7 to 8 that, in order to obtain a compact construction of the airbag module 3, the gas generator 56 is arranged laterally next to the airbag 33, with, in order to obtain an advantageous opening pressure, the gas jet 61 being aimed directly at the airbag outlet region and the gas jet blowing gas from the gas generator from below centrally into the folded-up airbag 33. In this embodiment which is illustrated in FIGS. 7 and 8, an airbag-housing outlet region 62 is closed by a protective covering 63 which keeps the airbag 33 in the folded-up state in the airbag housing 4 and which, when the airbag is activated, opens up a housing outlet opening 64 in a central region, with at least two flap parts being formed, as is apparent from FIG. 8, the swung-open flap parts forming, at least in some regions, an edge protection in such a manner that they cover adjacent edge regions 65.

In the exemplary embodiment of FIGS. 7 and 8, the covering flaps 46 and 47, which can be formed in the instrument-panel-side and in the accommodating-housing-side airbag outlet region 30, 31, are, according to a further preferred embodiment, preferably produced as a material bond, with the result that they merely form a single flap which can be pivoted up. This may, under some circumstances, have advantages in respect of the pivoting-up kinematics.

As is furthermore apparent from FIG. 1, an air duct 66 may also be arranged as the main air duct in the deformation space 55, in the form of an installation clearance, which is formed below the potential head impact region 38 of the instrument panel 6 and thus toward the vehicle interior 40, as seen in the direction of the vehicle longitudinal axis 10. This air duct 66 may be formed integrally with a lower side of the instrument panel, as is shown merely by dashed lines in FIG. 1, in such a manner that a lower-side wall region 67 of the instrument panel 6 forms part of the air duct wall.

An air duct of this type is generally produced from a plastic material which is not very stiff and therefore does not substantially impair the deformation characteristics of the potential head impact region 38 of the instrument panel.

We claim:

1. In a vehicle having a windshield, an airbag configuration, comprising:

an instrument panel having a front instrument-panel wall region adjacent to the windshield and a head-impact instrument panel wall region adjoining said front instrument panel wall region in a direction away from the windshield and toward a vehicle interior, said front instrument panel wall region being configured as an instrument-panel-side airbag outlet wall region, said head-impact instrument panel wall region having a potential head impact region;

an airbag disposed behind said instrument-panel-side airbag outlet wall region when said airbag is in an unactivated, folded-up basic state;

said airbag, when in an activated state, being inflated such that said airbag deploys through an airbag outlet opening to be formed in said instrument-panel-side airbag outlet wall region and such that said airbag is inflated in the vehicle interior in front of said instrument panel, said airbag having an initial filling pressure at a beginning of an airbag activation;

said airbag outlet opening, to be formed in said front instrument panel wall region when said airbag is inflated, being disposed at a given safety distance from said potential head impact region, the given safety distance being provided such that said airbag, after advancing in a direction toward the vehicle interior by a distance corresponding to the given safety distance between said airbag outlet opening and said potential head impact region, has a filling pressure which is reduced with respect to the initial filling pressure in accordance with given limit values;

said potential head impact region of said instrument panel being made from a deformable material, said deformable material being configured to absorb energy when being deformed; and said instrument panel providing a deformation space in a region below said potential head impact region such that, when a head impacts against said potential head impact region, said potential head impact region can be deformed in an unobstructed manner into said deformation space with energy being absorbed.

2. The airbag configuration according to claim 1, including a gas generator configured to provide a gas jet directed from below centrally into said airbag for unfolding said airbag.

3. The airbag configuration according to claim 1, including a filling device configured to provide a gas jet aimed directly at said instrument-panel-side airbag outlet wall region.

4. The airbag configuration according to claim 3, wherein said filling device is a gas generator.

5. The airbag configuration according to claim 1, wherein at least said front instrument panel wall region, which faces the windshield, has, at least in some regions thereof, air passage openings formed therein for a diffuse ventilation of the vehicle interior.

6. The airbag configuration according to claim 5, wherein:
said front instrument panel wall region has a load-bearing basic body;
a discharge nozzle is integrated in said load-bearing basic body of said front instrument panel wall region;
a perforated covering covers said load-bearing basic body from above, said perforated covering has perforations formed therein for providing said air passages openings, said perforations form a continuous perforation pattern for providing a diffuse ventilation at said discharge nozzle via said perforations; and
at least a portion of said perforated covering, in combination with said load-bearing basic body situated underneath said perforated covering, has at least one weakened point selected from the group consisting of a material weakening and a predetermined breaking point for providing said airbag outlet opening.

7. The airbag configuration according to claim 6, wherein:
said load-bearing basic body has a cutout formed therein, said cutout is located in said instrument-panel-side airbag outlet wall region; and said perforated covering covers said cutout from above and has at least one weakened point selected from the group consisting of a material weakening and a predetermined breaking point at said cutout for forming a pivotable covering flap.

8. The airbag configuration according to claim 1, wherein the given safety distance is provided such that, when said airbag has advanced by a distance corresponding to the given safety distance, the filling pressure in said airbag in said potential head impact region is at most substantially 15% of the initial filling pressure.

9. The airbag configuration according to claim 1, wherein the given safety distance is provided such that, when said airbag has advanced by a distance corresponding to the given safety distance, the filling pressure in said airbag in said potential head impact region is at most substantially 10% of the initial filling pressure.

10. The airbag configuration according to claim 1, wherein the given safety distance is provided such that, when said airbag has advanced by a distance corresponding to the given safety distance, the filling pressure in said airbag in said potential head impact region is at most substantially 5% of the initial filling pressure.

11. The airbag configuration according to claim 1, wherein said instrument panel and said airbag form a front-passenger airbag configuration in a front passenger region of the vehicle.

12. The airbag configuration according to claim 1, wherein the given safety distance is at least substantially 10 cm.

13. The airbag configuration according to claim 1, wherein said instrument panel is a motor vehicle instrument panel.

14. The airbag configuration according to claim 1, wherein the given safety distance is at least substantially 15 cm.

15. The airbag configuration according to claim 1, wherein the given safety distance is at least substantially 20 cm.

16. The airbag configuration according to claim 1, wherein said airbag has an initial filling pressure substantially between 30 bar and 35 bar and, after advancing by a distance of approximately 100 mm, has a filling pressure substantially between 2.5 bar and 3.5 bar.

17. The airbag configuration according to claim 1, wherein said airbag has an initial filling pressure substantially between 30 bar and 35 bar and, after advancing by a distance of approximately 100 mm, has a filling pressure substantially between 2.5 bar and 3.5 bar and, after advancing by a distance of substantially 200 mm, has a filling pressure substantially between 1.5 bar and 2.5 bar.

18. The airbag configuration according to claim 1, wherein the given safety distance, when viewed in cross section through said instrument panel, is substantially a straight, shortest path between a periphery of said potential head impact region facing said airbag outlet opening and a periphery of said airbag outlet opening facing said potential head impact region.

19. The airbag configuration according to claim 1, wherein at least a part of said potential head impact region of said instrument panel is made from an energy-absorbing material.

20. The airbag configuration according to claim 1, wherein at least said potential head impact region of said instrument panel includes a backing layer of energy-absorbing foam and a slush skin covering said backing-layer.

21. The airbag configuration according to claim 1, including:
a gas generator; and an airbag housing for accommodating said airbag, said airbag housing being configured such that said airbag, when in the folded-up basic state, is disposed laterally next to said gas generator.

22. The airbag configuration according to claim 1, including:
a gas generator;
an airbag housing having an airbag housing region and a gas-generator housing region, said airbag housing region accommodating said airbag, said gas-generator housing region accommodating said gas generator;
said airbag housing having a connecting region between said airbag housing region and said gas-generator housing region; and
said connecting region has a weakened point selected from the group consisting of a material weakening and a predetermined breaking point such that, when force is applied to said gas-generator housing region or said airbag housing region, said weakened point breaks in order to prevent a deformation region of said instrument panel from becoming a solid barrier.

23. The airbag configuration according to claim 22, wherein:
said potential head impact region of said head-impact instrument panel wall region is configured to be deformable;
said gas-generator housing region protrudes at least partly into said potential head impact region; and
said connecting region between said airbag housing region and said gas-generator housing region is configured to break at said weakened point when force is applied to said gas-generator housing region.

24. The airbag configuration according to claim 1, including:
an airbag module having an airbag housing and a gas generator;
said airbag being part of said airbag module, said airbag and said gas generator being accommodated in said airbag housing, said gas generator being connected to said airbag, as a filling device; and
said airbag housing being formed with a housing outlet region for said airbag, said housing outlet region being disposed at said instrument-panel-side airbag outlet wall region.

25. The airbag configuration according to claim 24, including a module carrier disposed below said airbag housing such that a gap distance is provided between said module carrier and said airbag housing when said airbag housing is in a mounted state.

26. The airbag configuration according to claim 24, including a module carrier disposed below said airbag housing such that a gap distance of substantially 8 to 10 mm is provided between said module carrier and said airbag housing when said airbag housing is in a mounted state.

27. The airbag configuration according to claim 24, including:
a protective covering for covering said housing outlet region of said airbag housing; and
said protective covering holding said airbag in said airbag housing when said airbag is in the unactivated, folded-up state and, when said airbag is in the activated state, said protective covering centrally opening up a housing outlet opening such that at least two flap parts are formed and such that said flap parts, when swung-open, at least partly cover adjacent edge regions of said housing outlet region for providing an edge protection.

28. The airbag configuration according to claim 1, wherein:
an installation clearance is provided below said potential head impact region of said instrument panel toward the vehicle interior when viewed in a direction of a vehicle longitudinal axis; and
an air duct is provided in said installation clearance.

29. The airbag configuration according to claim 28, wherein said air duct is integrally formed with a lower side of said instrument panel.

30. The airbag configuration according to claim 29, wherein an underside side wall region of said instrument panel forms part of an air duct wall.

31. The airbag configuration according to claim 24, including:
an airbag-module accommodating device disposed below said instrument-panel-side airbag outlet wall region; and
said airbag module, when in an installed position, being releasably connected to said airbag-module accommodating device for securing said airbag module in the installed position.

32. The airbag configuration according to claim 31, including a guide device, said airbag module being configured to be connected to said airbag-module accommodating device via said guide device.

33. The airbag configuration according to claim 32, wherein:
the vehicle defines a vehicle vertical axis and a vehicle longitudinal axis;
a module carrier is disposed such that a gap region is provided between said instrument-panel-side airbag outlet wall region and said module carrier; and
said airbag module is configured to be guided by said guide device such that said airbag module can be pushed substantially from below said module carrier, as seen in a direction of the vehicle vertical axis, and substantially from behind said module carrier, as seen in the direction of the vehicle longitudinal axis, into a fixed position in the gap region between said instrument-panel-side airbag outlet wall region and said module carrier.

34. The airbag configuration according to claim 32, wherein said guide device is configured as a slotted guide configuration having a guide slot and a guide pin guided therein as a sliding block.

35. The airbag configuration according to claim 34, wherein said guide pin is clamped in said guide slot such that said guide pin can be displaced only when a given clamping force, operating as a resistance force against said guide pin being pushed in, is exceeded.

36. The airbag configuration according to claim 34, wherein:
a front end of said guide-slot is configured as a latching socket; and
said guide pin latches releasably into said latching socket when said airbag module is in a pushed-in end position.

37. The airbag configuration according to claim 36, wherein:
said latching socket is configured as a U-profile; and
said guide pin is accommodated in said U-profile when said airbag module is in the pushed-in end position.

38. The airbag configuration according to claim 34, wherein:
said airbag-module accommodating device is configured as an airbag-module accommodating housing with accommodating-housing side walls; and said guide slot extends substantially over an entire length of one of said accommodating-housing side walls, as seen in a direction of a vehicle longitudinal axis.

39. The airbag configuration according to claim 34, wherein:
said airbag-module accommodating device is configured as an airbag-module accommodating housing with accommodating-housing side walls disposed opposite one another; and
said guide slot and a further guide slot are formed respectively identically on said accommodating-housing side walls.

40. The airbag configuration according to claims 34, wherein:
said airbag housing is a box-shaped airbag housing with airbag-housing side walls disposed opposite one another in a direction of a vehicle transverse axis; and
said guide pin is disposed in a front region of one of said airbag-housing side walls, said front region faces said instrument panel.

41. The airbag configuration according to claim 34, wherein said guide slot is formed on said airbag-module accommodating device and said guide pin is formed on said airbag housing.

42. The airbag configuration according to claim 41, wherein:
a module carrier is disposed such that a gap region is provided between said instrument-panel-side airbag outlet wall region and said module carrier;
said guide slot has a first slot region extending obliquely upward in a rear side-wall region of one of said accommodating-housing side walls, said rear side-wall region is disposed at a rear in relation to said instrument panel, as seen in a direction of a vehicle longitudinal axis, and protrudes substantially rearward over said module carrier;
said first slot region starts from a bottom side-wall edge region of said one of said accommodating-housing side walls, disposed at a bottom in relation to a direction of a vehicle vertical axis, and said first slot region reaches a top side-wall region of said one of said accommodating-housing side walls, disposed at a top in relation to a direction of the vehicle vertical axis; and
said guide slot has a second slot region directly adjoining said first slot region, said second slot region extends, starting from said first slot region, forward, as seen in the vehicle longitudinal direction, in a front side-wall region of said one of said accommodating-housing side walls, said front side-wall region is disposed at a front in relation to said instrument panel, as seen in a direction of the vehicle longitudinal axis.

43. The airbag configuration according to claim 42, wherein said second slot region extends forward substantially horizontally at a beginning and then extends forward with a rising angle relatively smaller than a rising angle of said first slot region.

44. The airbag configuration according to claim 43, wherein a substantially horizontal subregion of said second slot region extends substantially above said module carrier.

45. The airbag configuration according to claim 32, wherein:
said airbag housing is a box-shaped airbag housing with airbag-housing side walls disposed opposite one another in a direction of a vehicle transverse axis;
said airbag-module accommodating device is configured as an airbag-module accommodating housing with accommodating-housing side walls adjacent to said airbag-housing side walls;
said airbag housing, when in a pushed-in state, is enclosed by said accommodating-housing side walls; and
said guide device is formed at said accommodating-housing side walls and said airbag-housing side walls such that a respective first guide element, disposed on each of said airbag-housing side walls, interacts with a respective second guide element correspondingly formed on said accommodating-housing side walls.

46. The airbag configuration according to claim 45, wherein:
said airbag-module accommodating housing has an accommodating-housing upper wall; and
said airbag housing of said airbag module, when inserted in said airbag-module accommodating housing, is accommodated substantially in a form-fitting manner therein, and said accommodating-housing upper wall covers said airbag housing from above.

47. The airbag configuration according to claim 45, including a releasable connecting element for connecting said airbag housing to said airbag-module accommodating housing in an installation region which is readily accessible from below and, in relation to said instrument panel, is situated in a direction toward the vehicle interior, when viewed in a direction of a vehicle longitudinal axis.

48. The airbag configuration according to claim 47, wherein said releasable connecting element is a clip connection or a screw connection.

49. The airbag configuration according to claim 47, wherein:
said airbag-module accommodating housing and said airbag housing have a flange region projecting rearward in a direction of the vehicle interior, when viewed in a direction of the vehicle longitudinal axis; and
said releasable connecting element is disposed in said flange region.

50. The airbag configuration according to claim 45, including:
a module carrier disposed below said airbag housing such that a gap distance is provided between said module carrier and said airbag housing when said airbag housing is in a mounted state; and
said airbag-module accommodating housing being configured to be fixed to at least one of said instrument panel and said module carrier.

51. The airbag configuration according to claim 45, wherein said airbag-module accommodating housing has an airbag outlet region at said instrument-panel-side airbag outlet wall region when said airbag-module accommodating housing is in a mounted state.

52. The airbag configuration according to claim 51, wherein said airbag-module accommodating housing has a separating line or predetermined tearing line in order to form said airbag outlet region of said airbag-module accommodating housing.

53. The airbag configuration according to claim 51, wherein:
said airbag-module accommodating housing has an accommodating-housing upper wall; and
said airbag outlet region of said airbag-module accommodating housing is formed in said accommodating-housing upper wall.

54. The airbag configuration according to claim 51, wherein said airbag outlet region of said airbag-module accommodating housing and said front instrument panel wall region configured as said instrument-panel-side airbag outlet wall region are disposed next to one another in an abutting connection and form a covering flap which can be pivoted up in a direction toward the windshield to open up said airbag outlet opening.

55. The airbag configuration according to claim 54, wherein said airbag outlet region of said airbag-module accommodating housing and said front instrument panel wall region configured as said instrument-panel-side airbag outlet wall region form a material bond.

56. The airbag configuration according to claim 54, wherein said covering flap, when in a swung open state, shields said windshield from a direct impact of said airbag, at least at a beginning of an inflation, and guides said airbag towards the vehicle interior.

57. The airbag configuration according to claim 54, including a retaining device coupled to said covering flap such that said covering flap, when in a swung-open state or while being swung open, does not strike against the windshield.

58. The airbag configuration according to claim 57, wherein said retaining device is an element selected from the group consisting of a stop and a catch strap.

59. The airbag configuration according to claim 51, wherein:
   said airbag-module accommodating housing has an abutment region disposed adjacent said airbag outlet region of said airbag-module accommodating housing; and
   said airbag-module accommodating housing is fixedly connected to said instrument panel via said abutment region.

60. The airbag configuration according to claim 59, wherein said airbag-module accommodating housing is riveted to said instrument panel.

61. The airbag configuration according to claim 59, wherein said abutment region of said airbag-module accommodating housing is configured as a separate component and is configured to be connected to said instrument panel.

62. The airbag configuration according to claim 61, wherein said abutment region, as said separate component, is configured to be first connected to said instrument panel and then, during a further course of installation, to a remaining portion of said airbag-module accommodating housing.

63. The airbag configuration according to claim 62, wherein said abutment region as said separate component is configured to be connected to said remaining portion of said airbag-module accommodating housing via at least one connecting element selected from the group consisting of a rivet, a screw, and a clip.

64. The airbag configuration according to claim 61, wherein:
   said abutment region is a U-shaped configuration with a U-base region and U-limbs, said U-base region is configured to be connected to a lower side of said instrument panel; and
   said U-limbs of said abutment region surround a part of a remaining portion of said airbag-module accommodating housing for connecting said abutment region to said remaining portion of said airbag-module accommodating housing.

65. The airbag configuration according to claim 64, wherein said part of said remaining portion of said airbag-module accommodating housing accommodates said gas generator.

* * * * *